United States Patent [19]
Nishikawa

[11] Patent Number: 5,928,339
[45] Date of Patent: Jul. 27, 1999

[54] DMA-TRANSFERRING STREAM DATA APPARATUS BETWEEN A MEMORY AND PORTS WHERE A COMMAND LIST INCLUDES SIZE AND START ADDRESS OF DATA STORED IN THE MEMORY

[75] Inventor: Junji Nishikawa, Osaka, Japan

[73] Assignee: Matsushita Electric Industrial Co., Ltd., Osaka, Japan

[21] Appl. No.: 08/954,694

[22] Filed: Oct. 20, 1997

[30] Foreign Application Priority Data

Oct. 18, 1996 [JP] Japan ................................. 8-275774

[51] Int. Cl.$^6$ .................. G06F 13/10; G06F 13/374; G06F 13/38
[52] U.S. Cl. ................. 710/26; 710/24; 710/23; 711/147; 711/153
[58] Field of Search ....................... 710/26, 23, 24, 710/129, 200, 1, 5, 4, 45; 345/501, 328, 509; 358/451; 348/7; 711/147, 153; 709/231; 712/15

[56] References Cited

U.S. PATENT DOCUMENTS

| | | | |
|---|---|---|---|
| 4,896,256 | 1/1990 | Roberts | 364/200 |
| 4,896,266 | 1/1990 | Klashka | 710/45 |
| 4,941,201 | 7/1990 | Davis | 455/41 |
| 5,008,760 | 4/1991 | Shimizu | 358/451 |
| 5,438,665 | 8/1995 | Taniai | 710/25 |
| 5,450,549 | 9/1995 | Casparian | 345/509 |
| 5,508,940 | 4/1996 | Rossmere | 345/328 |
| 5,583,561 | 12/1996 | Baker | 348/7 |
| 5,655,112 | 8/1997 | MacInnis | 345/501 |
| 5,805,821 | 9/1998 | Saxena | 709/231 |
| 5,848,293 | 12/1998 | Gentry | 710/5 |
| 5,860,022 | 1/1999 | Kondou | 710/1 |
| 5,862,407 | 1/1999 | Sriti | 710/22 |
| 5,867,686 | 2/1999 | Conner | 709/200 |

FOREIGN PATENT DOCUMENTS

| | | |
|---|---|---|
| 354058 | 5/1991 | Japan . |
| 5151146 | 6/1993 | Japan . |
| 5334232 | 12/1993 | Japan . |
| 6250965 | 9/1994 | Japan . |

*Primary Examiner*—Thomas C. Lee
*Assistant Examiner*—Mohamed Mashaal
*Attorney, Agent, or Firm*—Price Gess & Ubell

[57] ABSTRACT

A data transfer apparatus for DMA-transferring stream data between a memory and each of n ports. The data transfer apparatus includes: an address counter for storing a start address of a memory area between which and a port a next piece of stream data is DMA-transferred; a data counter for storing a size of the next piece of stream data; n chain address counters each for storing an address of a memory area storing a certain command list; a port selecting unit for selecting one port; a command list transferring unit for, each time the port selecting unit selects a port, obtaining a command list according to a chain address counter corresponding to the selected port, transferring a start address in the command list to the address counter, transferring a size in the command list to the data counter, transferring the command to the port selecting unit, and updates the chain address counter; a stream data transferring unit for DMA-transferring a piece of stream data between the selected port and the memory area specified by the address counter. After the stream data transferring unit completes a DMA transfer, the port selecting unit, based on a predetermined order and the command, selects a new port or a current port. Each time the command list transferring unit transfers the size to the data counter, the stream data transferring unit DMA-transfers a piece of stream data between the selected port and the memory area specified by the address counter.

20 Claims, 21 Drawing Sheets

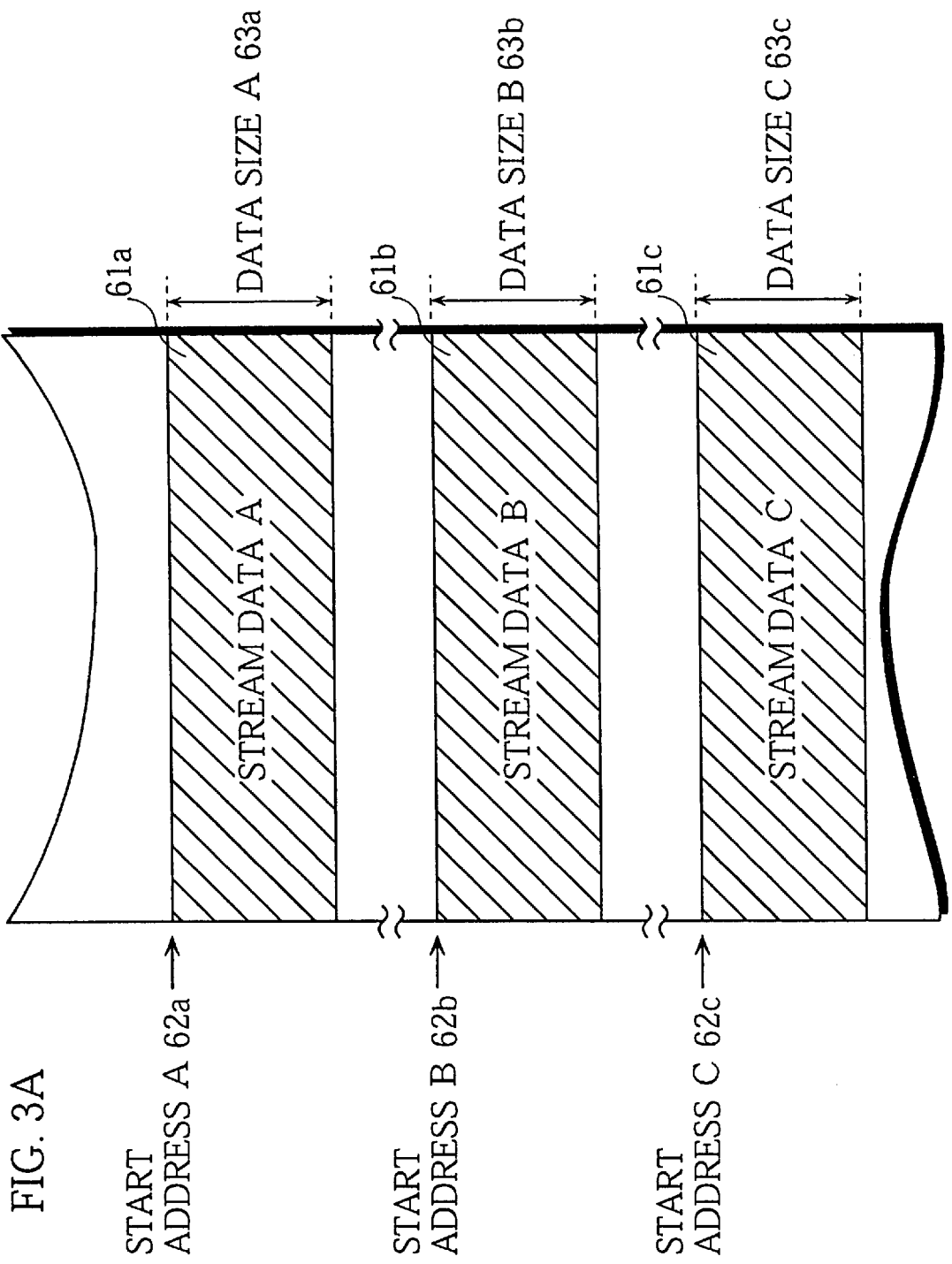

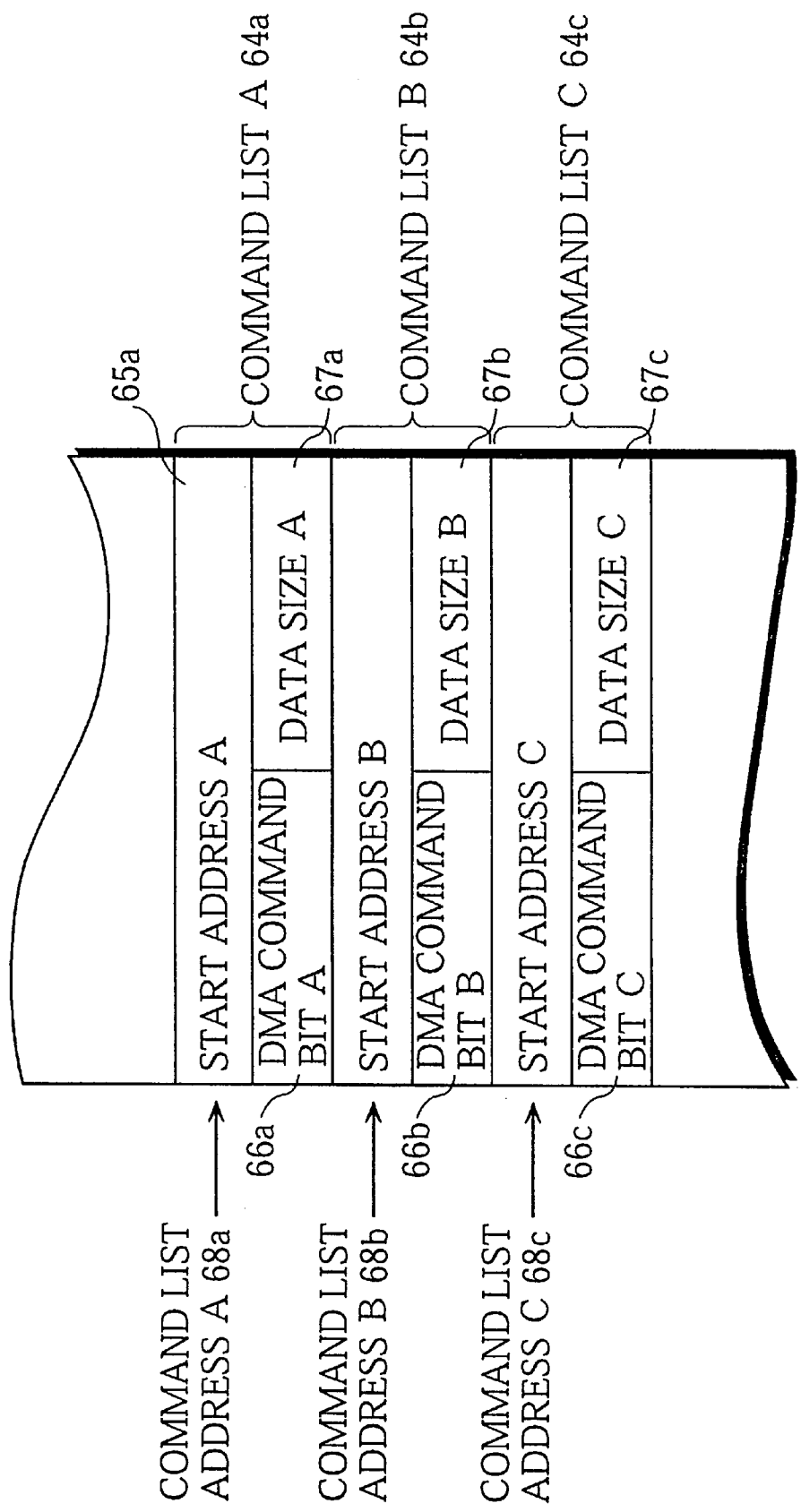

FIG. 4

| DMA COMMAND BIT | OPERATION | |
|---|---|---|
| 00 | SAME PORT | 66d |
| 01 | CHANGE PORT | 66e |
| 10 | END OF CHAIN | 66f |
| 11 | WAIT FOR FRAME PULSE | 66g |

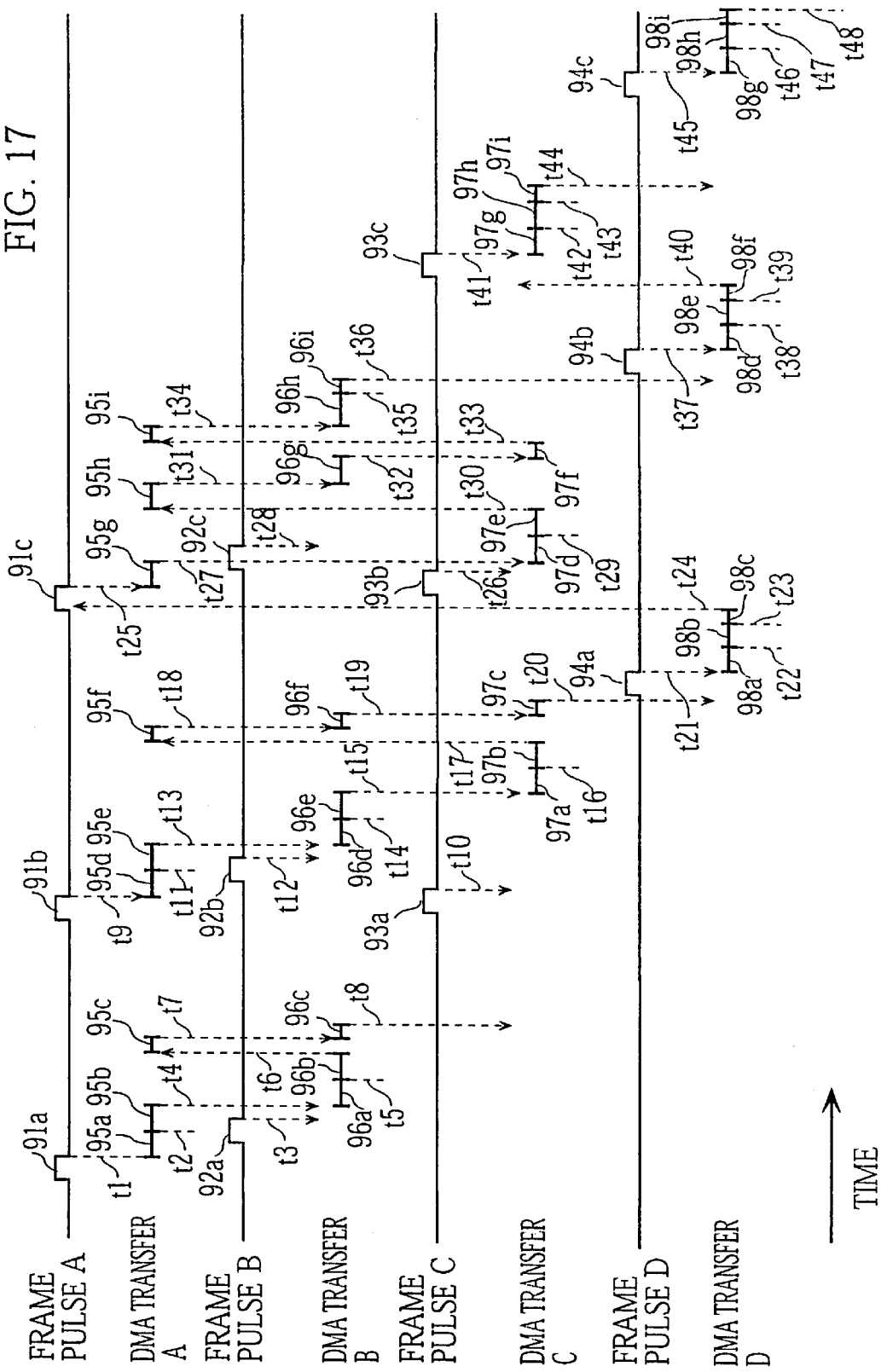

DMA-TRANSFERRING STREAM DATA APPARATUS BETWEEN A MEMORY AND PORTS WHERE A COMMAND LIST INCLUDES SIZE AND START ADDRESS OF DATA STORED IN THE MEMORY

BACKGROUND OF THE INVENTION (1). Field of the Invention

This invention relates to a data transfer apparatus or a data transfer system for arbitrating a plurality of I/O ports in data transfers, specifically to a data transfer apparatus or a data transfer system which transfers stream data in certain units between a plurality of I/O ports and a plurality of corresponding storage areas with the DMA (Direct Memory Access) method.

(2). Description of the Prior Art

Data transfer systems, which input/output stream data such as video data to/from a plurality of users, provide a demand-type service in which specified pieces of stream data are transferred based on transfer requests specifying users.

Such data transfer systems include mass storages such as HDDs (Hard Disk Drives) or optical disk drives for storing large amounts of stream data. A piece of stream data specified by a user is transferred from the mass storages via a channel, or vice versa. The channels are achieved by I/O ports which are respectively assigned to the users and used for transferring the stream data.

FIG. 1 is a block diagram showing a conventional data transfer system.

The conventional data transfer system is composed of CPU 10, memory 11, system bus 12, SCSI interface 13, HDDs 14a, 14b, 14c, and 14d, and stream interfaces 50a, 50b, 50c, and 50d. The drawing also shows external units: video monitors 16a, 16b, and 16c, and video cassette recorder 17.

CPU 10 generates commands required for transferring specified pieces of stream data based on the transfer requests for respective users and stores the commands in memory 11. CPU 10 also transfers the commands from memory 11 to stream interface 50a, 50b, 50c, or 50d.

Memory 11 stores the commands generated by CPU 10 and temporarily stores stream data during data transfers.

System bus 12 is connected to CPU 10, memory 11, system bus 12, SCSI interface 13, and stream interfaces 50a, 50b, 50c, and 50d and is used for transferring the stream data and the commands between these units. System bus 12 is achieved, for example, by a PCI (Peripheral Component Interconnect) bus which is a local bus standard. The bus width of the PCI bus is 32 bits or 64 bits and the operating frequency is 33 MHz. When the bus width is 32 bits and the operating frequency is 33 MHz, for example, the data transfer performance of the PCI bus is 133 MB/s.

SCSI interface 13 is connected to system bus 12 and HDDs 14a, 14b, 14c, and 14d. SCSI interface 13, on receiving a command from CPU 10 which is required for transferring stream data, transfers the stream data between memory 11 and each HDD via system bus 12, based on the command.

HDDs 14a, 14b, 14c, and 14d store stream data.

Stream interface 50a is connected to system bus 12 and video monitor 16a. Stream interface 50b is connected to system bus 12 and video monitor 16b. Stream interface 50c is connected to system bus 12 and video monitor 16c. Stream interface 50d is connected to system bus 12 and video monitor 16d.

Each stream interface, on receiving a command required for transferring the stream data from CPU 10, transfers the stream data between memory 11 and each external unit via system bus 12, based on the command. The connection between each stream interface and each external unit conforms to, for example, IEEE1394 which is a standard for serial digital transfer. The IEEE standard allows data transfer at a rate of 100 Mbps at the maximum. That means, it has enough capacity for transferring image information at a rate of 30 Mbps.

In general, the SCSI interface 13 and the stream interfaces use the DMA transfer method for transferring data. Japanese Laid-Open Patent Application No.5-151146 ("DMA Transfer Method") discloses a DMA transfer method. This conventional technique includes a means for tracing an address and a data length for the data transfer next in order so that a plurality of DMA transfers are executed with only one activation of CPU. Such a "chained" DMA transfer is suitable for sequentially transferring a large amount of high bit-rate stream data, such as image information.

Japanese Laid-Open Utility Model No.3-54058 ("DMA Control Circuit") discloses a method for DMA-transferring data between an input/output unit and a memory which is managed with the virtual storage method. Note that the term "DMA-transferring" used in the present description indicates transferring data with the DMA (Direct Memory Access) method. This conventional technique discloses executing a "chained" DMA transfer which enables a sequential transfer of data stored in the memory managed by the virtual storage method.

Japanese Laid-Open Patent Application No.6-250965 ("Input/Output Control Apparatus") discloses a method for DMA-transferring data between a plurality of input/output units and a memory. This conventional technique discloses holding of a plurality of commands and a status, which improves the effectiveness of the process.

Japanese Laid-Open Patent Application No.5-334232 ("DMA Transfer Control Apparatus") discloses a method for DMA-transferring data between a plurality of input/output units and a memory achieved by a DRAM (Dynamic Random Access Memory device). This conventional technique discloses presetting of the number of accesses, which balances the amounts of data transferred by the plurality of input/output units and the memory, increasing the memory accesses in the high-speed access mode which is provided by the DRAM, and improving the effectiveness of the data transfer.

The above conventional data transfer system has the following characteristics.

Firstly, for the data transfers between an HDD and a memory or between a memory and a stream interface, the stream data, which is stored in sequence, is read in units of blocks. This increases the effectiveness in data reading, increases the amount of data processed for each data reading, and increases the data transfer rate as a whole, where the data transfer rate indicates the amount of data transferred per unit time. For example, data transfer rate of 20 MB/s is achieved by an HDD with an interface conforming to the Fast Wide SCSI standard. Accordingly, the above effects reduce the time period during which the system bus is occupied by a data transfer, resulting in an effective use of the system bus.

Secondly, the data transfer rate in each channel is lower than that for data transfer between an HDD and a memory or between a memory and a stream interface. For example, the data transfer rate for image information compressed under the MPEG1 standard is 1.5 Mbps (=0.1875 MB/s). Also, the data transfer rate for compressed high-quality image information is about 30 Mbps (=3.75 MB/s).

The above data transfer rates indicate that a plurality of pieces of image information can be transferred in parallel by one data transfer system.

Such image information is managed in units of frames. Generally 30 frames of image information correspond to the images reproduced in one second. Also, frame pulses are used for indicating each separated frame.

However, the above conventional technique has a few problems. That is, it is impossible for the conventional technique to secure that each piece of the stream data is output to each of a plurality of I/O ports in real time. Also, a display image is disturbed if the transferred image information is broken for more than a certain time period. Especially, this tends to happen when a plurality of pieces of image information are output.

SUMMARY OF THE INVENTION

It is therefore an object of the present invention to provide a data transfer apparatus and a data transfer system which transfer stream data effectively by arbitrating a plurality of I/O ports to each of which the stream data is output so that transferring of the stream data is not broken for more than a certain time period.

The above object is achieved by a data transfer apparatus for DMA-transferring stream data between a memory and each of n ports, the memory including a plurality of memory areas and prestoring command lists which each include: a start address of a memory area in which the piece of stream data is stored; a size of the piece of stream data; and a command indicating selecting a current port or a new port, where n is an integer equal to or greater than "2," the data transfer apparatus including: an address counter for storing a start address of one of the plurality of memory areas between which and a port a piece of stream data next in order is DMA-transferred, and the address counter is used for each of n ports; a data counter for storing a size of the piece of stream data next in order, where the data counter is used for each of n ports; n chain address counters each for storing an address of a memory area, where a certain chain address counter includes an address of a memory area in which a certain command list is stored and the certain command list includes: an address corresponding to the start address included in the address counter; and a size corresponding to the size included in the data counter, where the n chain address counters respectively correspond to the n ports; a port selecting unit for selecting one port; a command list transferring unit for, each time the port selecting unit selects a port, obtaining a command list stored in a memory area specified by an address stored in a chain address counter which corresponds to the port selected by the port selecting unit, transferring a start address included in the command list to the address counter, transferring a size included in the command list to the data counter, transferring the command included in the command list to the port selecting unit, and updates the address stored in the chain address counter; a stream data transferring unit for DMA-transferring a piece of stream data of the size included in the data counter between the port selected by the port selecting unit and the memory area specified by the start address included in the address counter, where after the stream data transferring unit completes a DMA transfer, the port selecting unit, based on a predetermined order and the command obtained by the command list transferring unit, selects a new port or a current port, where each time the command list transferring unit transfers the size to the data counter, the stream data transferring unit DMA-transfers a piece of stream data between the port selected by the port selecting unit and the memory area specified by the start address stored in the address counter, where the piece of stream data is of the size stored in the data counter.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3A shows buffer areas in memory 11 in which stream data is temporarily stored;

FIG. 3B shows the construction of the chain list stored in memory 11;

FIG. 4 shows operations specified by the DMA command bits;

FIG. 12 shows the construction of buffer 33a;

FIG. 13 shows control line FP 44a;

FIG. 17 shows a simultaneous operation of a plurality of ports when DMA controller 20 of the present invention is used;

FIG. 18A shows the chain lists used for DMA-transferring the stream data to port 41a;

DESCRIPTION OF THE PREFERRED EMBODIMENTS

Embodiment 1

System Construction

Figure 2:
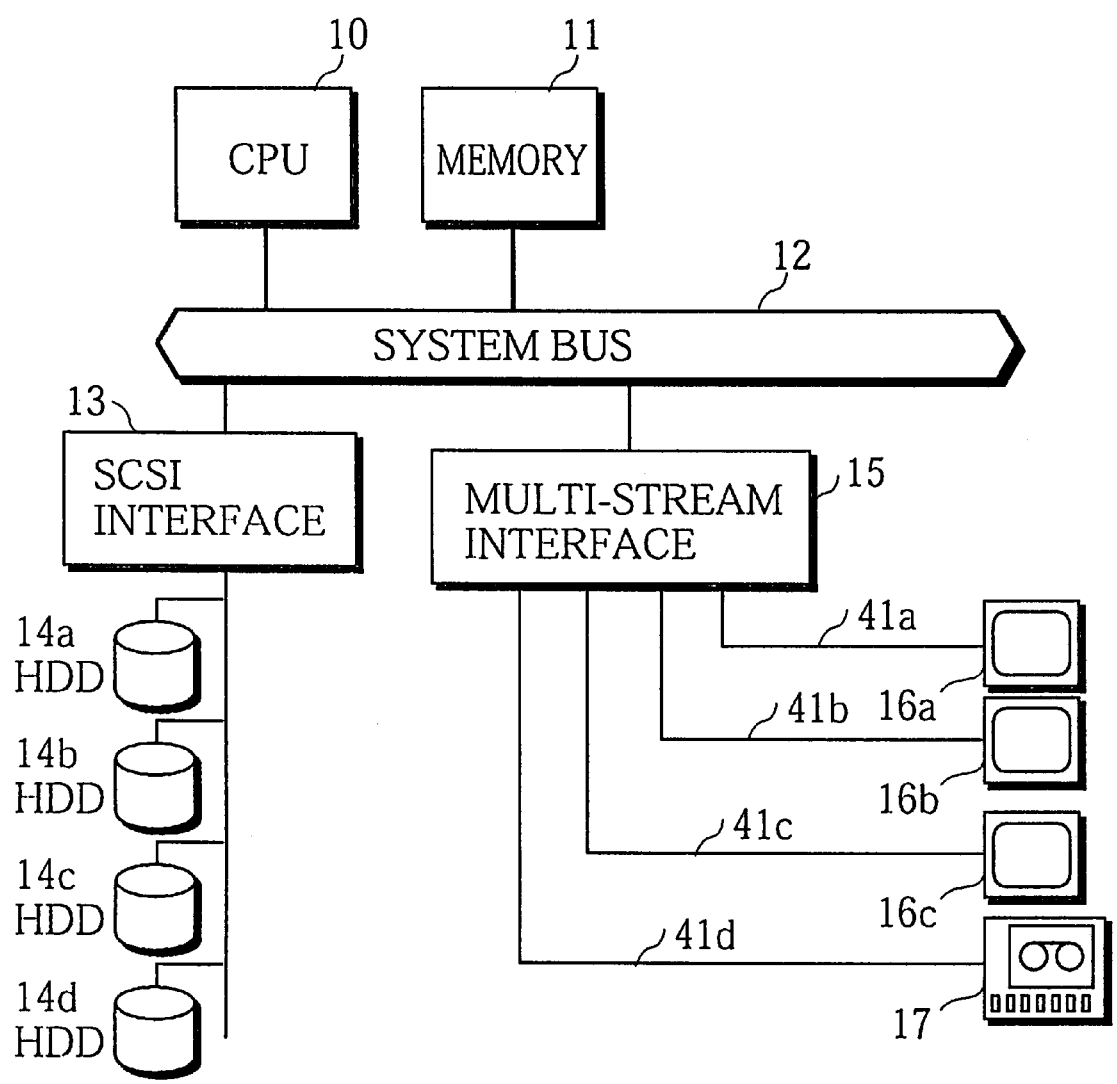
FIG. 2 is a block diagram showing the data transfer system of the present invention in Embodiment 1.

FIG. 2 is a block diagram showing the data transfer system of the present invention in Embodiment 1.

Figure 1:
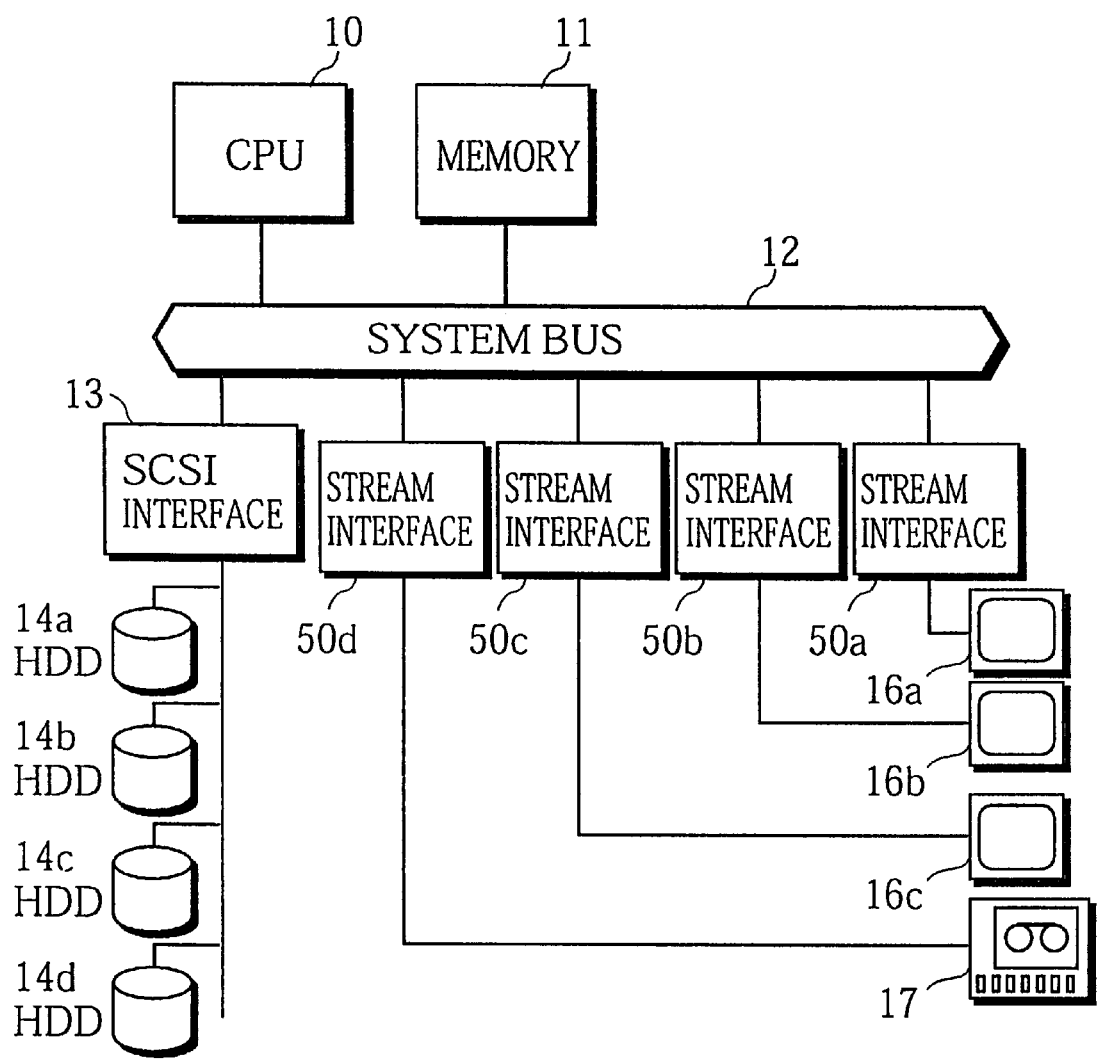
FIG. 1 is a block diagram showing a conventional data transfer system.

The data transfer system is constructed the same as the conventional technique shown in FIG. 1, except that the present data transfer system includes stream interfaces 50a, 50b, 50c, and 50d and multi-stream interface 15. Accordingly, the following description is mainly on the multi-stream interface 15, omitting the description of the common parts.

Note that ports 41a, 41b, 41c, and 41d connect the data transfer system with respective corresponding external units.

The following description deals with a case in which stream data is transferred to an external unit from the data transfer system based on a request to transfer the stream data to a user.

Suppose HDD 14a, 14b, 14c, or 14d prestores stream data.

CPU 10 generates an HDD command for, based on a request to transfer a piece of stream data to a user, DMA-transferring the specified piece of stream data from HDD 14a, 14b, 14c, or 14d to memory 11 in one frame unit, temporarily stores the generated HDD command in memory 11, and then DMA-transfers the HDD command to SCSI interface 13. CPU 10 also generates commands for respective external units and a command list for DMA-transferring the one frame of the piece of stream data from memory 11 to a specified external unit, and stores the generated commands and command list into memory 11. The SCSI interface 13, on receiving the HDD command, DMA-transfers the specified piece of stream data from HDD 14a, 14b, 14c, or 14d to memory 11 in one frame unit. After this, CPU 10 transfers the commands for respective external units from memory 11 to multi-stream interface 15 when multi-stream interface 15 is ready to transfer the one frame of the stream data to a corresponding internal buffer.

CPU 10 repeats the above procedure for each frame until all frames of the specified piece of stream data are transferred.

CPU 10 executes the above operations in parallel for each external unit connected to the data transfer system.

The command list and multi-stream interface 15 are described in detail later.

An external unit transmits the stream data to HDD 14a, 14b, 14c, or 14d with the above procedure reversed.

Construction of Buffer Areas in Memory 11

FIG. 3A shows buffer areas, formed in memory 11, in which the stream data is temporarily stored.

Stream data A 61a, B 61b, and C 61c in the drawing indicate the stream data having been DMA-transferred into memory 11. Note that the stream data A61a, B61b, and C61c formed a sequence of stream data before they were transferred into memory 11.

The start addresses A 62a, B 62b, and C 62c indicate respective start addresses of stream data A61a, B61b, and C61c.

The data sizes A 63a, B 63b, and C 63c indicate respective data sizes of stream data A61a, B61b, and C61c.

It is supposed that an operating system (OS) for multi tasks and multi users, such as UNIX, is used in the present embodiment. Under such an OS, memory 11 is managed with the virtual storage management in units of pages, with the size of one page 4KB. Accordingly, the storage area of memory 11 is divided into 4KB-areas. The lower 12 bits of the start address, which is represented by bytes, are all "0" and the upper 20 bits indicate a page address.

Command List

FIG. 3B shows the construction of the chain list stored in memory 11.

The chain list is composed of a plurality of command lists arranged in order, as shown in the drawing.

The command list A 64a includes start address A 65a, data size A 67a, and DMA command bit A 66a. Similarly, the command list B 64b includes start address B 65b, data size B 67b, and DMA command bit B 66b, and the command list C 64c includes start address C 65c, data size C 67c, and DMA command bit C 66c.

The start addresses A 65a, B 65b, and C 65c indicate respective start addresses of the buffer areas formed in memory 11 for the DMA transfer.

The data sizes A 67a, B 67b, and C 67c indicate respective data sizes of the pieces of stream data to be transferred.

DMA command bits A 66a, B 66b, and C 66c indicate respective next DMA transfer operations.

FIG. 4 shows operations specified by the DMA command bits.

As shown in the drawing, four types of operations are specified by four DMA command bits, namely, 00, 01, 10, and 11. The four operations are: "same port" 66d, "change port" 66e, "end of chain" 66f, and "wait for frame pulse" 66g.

The operation "same port" 66d indicates that after stream data is DMA-transferred to a corresponding port, stream data is DMA-transferred again to the same port.

The operation "change port" 66e indicates that after stream data is DMA-transferred to a corresponding port, it is judged whether stream data is DMA-transferred to a different port.

The operation "end of chain" 66f indicates the end of the chain list.

The operation "wait for frame pulse" 66g indicates that after stream data is DMA-transferred to a corresponding port, it is judged whether stream data is DMA-transferred to a different port, and that stream data is not transferred to the port until the port receives a frame pulse.

The command list addresses A 68a, B 68b, and C 68c indicate respective start addresses of command lists A 64a, B 64b, and C 64c.

Construction of Multi-Stream Interface 15

Figure 5:
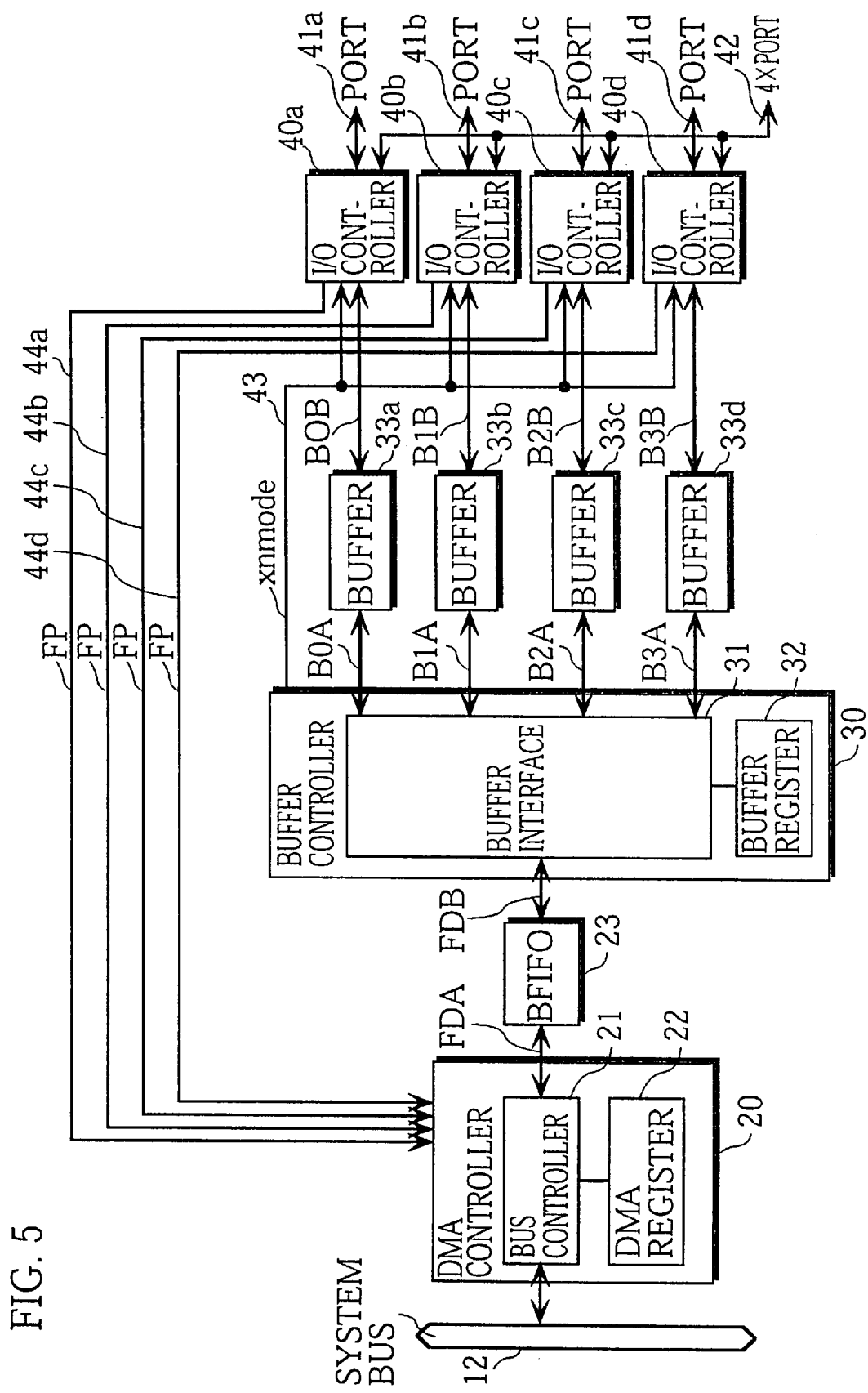
FIG. 5 is a block diagram showing the construction of multi-stream interface 15.

FIG. 5 is a block diagram showing the construction of multi-stream interface 15.

Multi-stream interface 15 is composed of DMA controller 20, BFIFO 23, buffer controller 30, buffers 33a, 33b, 33c, and 33d, I/O controllers 40a, 40b, 40c, and 40d. The 4Xport 42, which is not shown in FIG. 2, is connected to a VCR (Video Cassette Recorder) or the like which transfers stream data at a speed four times that of the other external units.

The drawing also shows external units which do not belong to multi-stream interface 15. The external units are system bus 12, ports 41a, 41b, 41c, and 41d, and 4Xport 42. The frame pulse is output from ports 41a, 41b, 41c, and 41d, and 4Xport 42. The xnmode 43, FPs 44a, 44b, 44c, and 44d are control lines.

There are other control lines which are not shown in FIG. 5.

DMA controller 20 includes bus controller 21 for controlling the memory access in system bus 12, and DMA register 22 for storing information required by DMA.

BFIFO 23, being achieved by a bidirectional FIFO (First-In-First-Out) memory, is used as a buffer for storing data transferred between DMA controller 20 and buffer controller 30.

Buffer controller 30 transfers data between BFIFO 23, and buffers 33a, 33b, 33c, and 33d. Buffer controller 30 includes buffer interface 31 for controlling the data transfer between BFIFO 23, and buffers 33a, 33b, 33c, and 33d, and also includes buffer register 32 for storing information required for the data transfer between buffers.

Buffers 33a, 33b, 33c, and 33d, being achieved by, for example, field memories, store data between buffer controller 30 and the I/O controllers.

I/O controllers 40a, 40b, 40c, and 40d are respectively attached to buffers 33a, 33b, 33c, and 33d to respectively connect to corresponding ports.

I/O controller 40a transfers data between buffer 33a and either of port 41a and 4Xport 42. I/O controller 40b transfers data between buffer 33b and either of port 41b and 4Xport 42. I/O controller 40c transfers data between buffer 33c and either of port 41c and 4Xport.42. I/O controller 40d transfers data between buffer 33d and either of port 41d and 4Xport 42.

The xnmode 43 is a control line used when buffer controller 30 selects one out of I/O controllers 40a, 40b, 40c, and 40d.

FP 44a is a control line used when I/O controller 40a transfers a frame pulse from port 41a to DMA controller 20. FP 44b is a control line used when I/O controller 40b transfers a frame pulse from port 41b to DMA controller 20. FP 44c is a control line used when I/O controller 40c transfers a frame pulse from port 41c to DMA controller 20. FP 44d is a control line used when I/O controller 40d transfers a frame pulse from port 41d to DMA controller 20.

DMA register 22

Figure 6A:
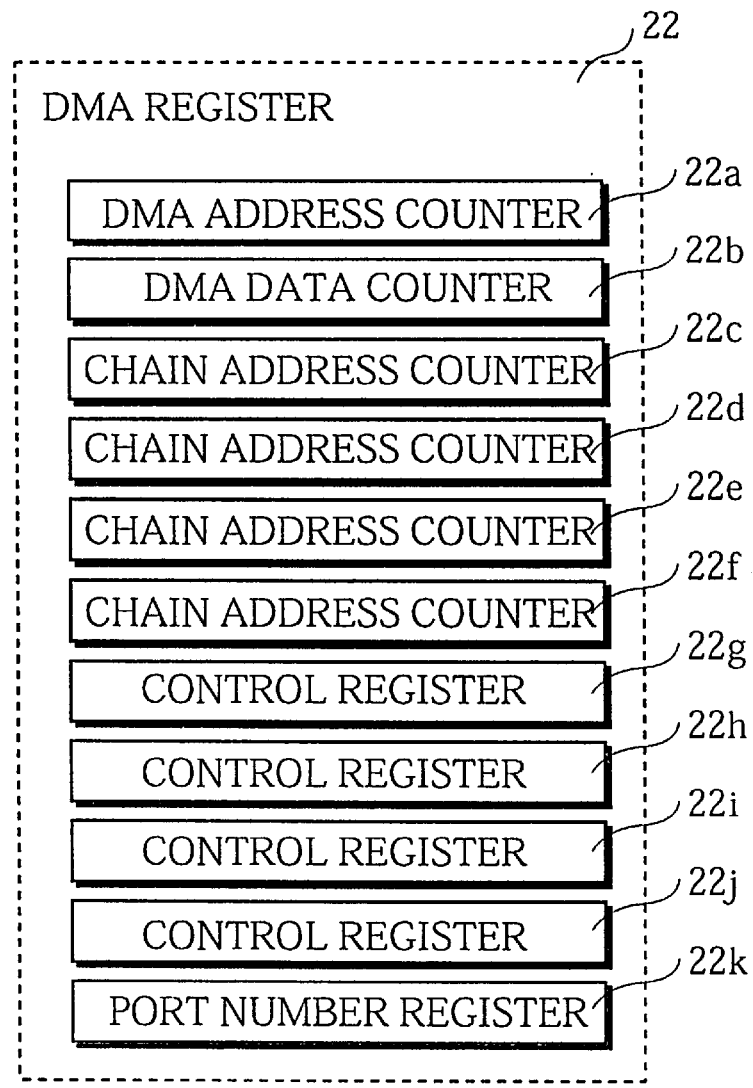
FIG. 6A shows the construction of DMA register 22.

FIG. 6A shows the construction of DMA register 22 which is included in DMA controller 20.

As shown in the drawing, DMA register 22 is composed of DMA address counter 22a, DMA data counter 22b, chain address counters 22c, 22d, 22e, and 22f, control registers 22g, 22h, 22i, and 22j, and port number register 22k.

It is supposed in the present embodiment that memory 11 prestores at least one command list and that memory 11 includes areas for storing the stream data.

DMA address counter 22a stores the start address of the memory area to which a piece of stream data next in order is DMA-transferred between the memory area and one of the four ports.

DMA data counter 22b stores the size of the stream data to be DMA-transferred between one of the four ports and the memory area specified by the start address stored in DMA address counter 22a.

Chain address counters 22c, 22d, 22e, and 22f, respectively corresponding to four ports, store addresses of memory areas in which command lists are stored.

Each command list includes a start address of a memory area and a size of stream data, where the start address corresponds to the start address stored in a corresponding DMA address counter, and the size of stream data corresponds to the size stored in a corresponding DMA data counter.

Control registers 22g, 22h, 22i, and 22j, respectively corresponding to ports 41a, 41b, 41c, and 41d, show the status of the DMA transfer of the corresponding ports.

Figure 6B:
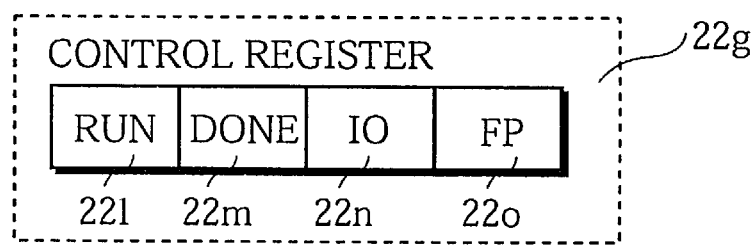
FIG. 6B shows the fields of control register 22g.

FIG. 6B shows the fields of control register 22g. Note that control registers 22h, 22i, and 22j have a similar construction for the fields and the description is omitted here.

As shown in FIG. 6B, control register 22g includes fields RUN 22l, DONE 22m, IO 22n, and FP 22o.

The field RUN 22l specifies whether to activate a DMA transfer related to the corresponding port 41a. The field RUN 22l is directly set by CPU 10 when CPU 10 activates a DMA transfer to the corresponding port 41a. The field RUN 22l "1" indicates that the DMA transfer is activated; the field RUN 22l "0" indicates that the DMA transfer is not activated.

The field DONE 22m indicates whether a DMA transfer related to the corresponding port 41a has been completed. The field DONE 22m is set when the DMA command bit, which is included in the command list read during the DMA transfer related to the corresponding port 41a, is "end of chain" 66f. The field DONE 22m is reset when CPU 10 activate a DMA transfer. The field DONE 22m "1" indicates that the DMA transfer has been completed; the field DONE 22m "0" indicates that the DMA transfer has not been completed.

The field IO 22n shows the direction of a DMA transfer related to the corresponding port 41a. The field IO 22n "0" indicates that the stream data is output to port 41a; the field IO 22n "1" indicates that the stream data is input from port 41a.

The field FP 22o indicates whether a frame pulse has been input from the corresponding port 41a. The field FP 22o is set when a frame pulse is input from the corresponding port 41a. The field FP 22o is reset when the DMA command bit, which is included in the command list read during the DMA transfer related to the corresponding port 41a, is "wait for frame pulse" 66g. The field FP 22o "1" indicates that a frame pulse has been input from the corresponding port 41a; the field FP 22o "0" indicates that a frame pulse has not been input.

The port number register 22k stores the port number of a port via which stream data is DMA-transferred.

Bus Controller 21

Figure 7:
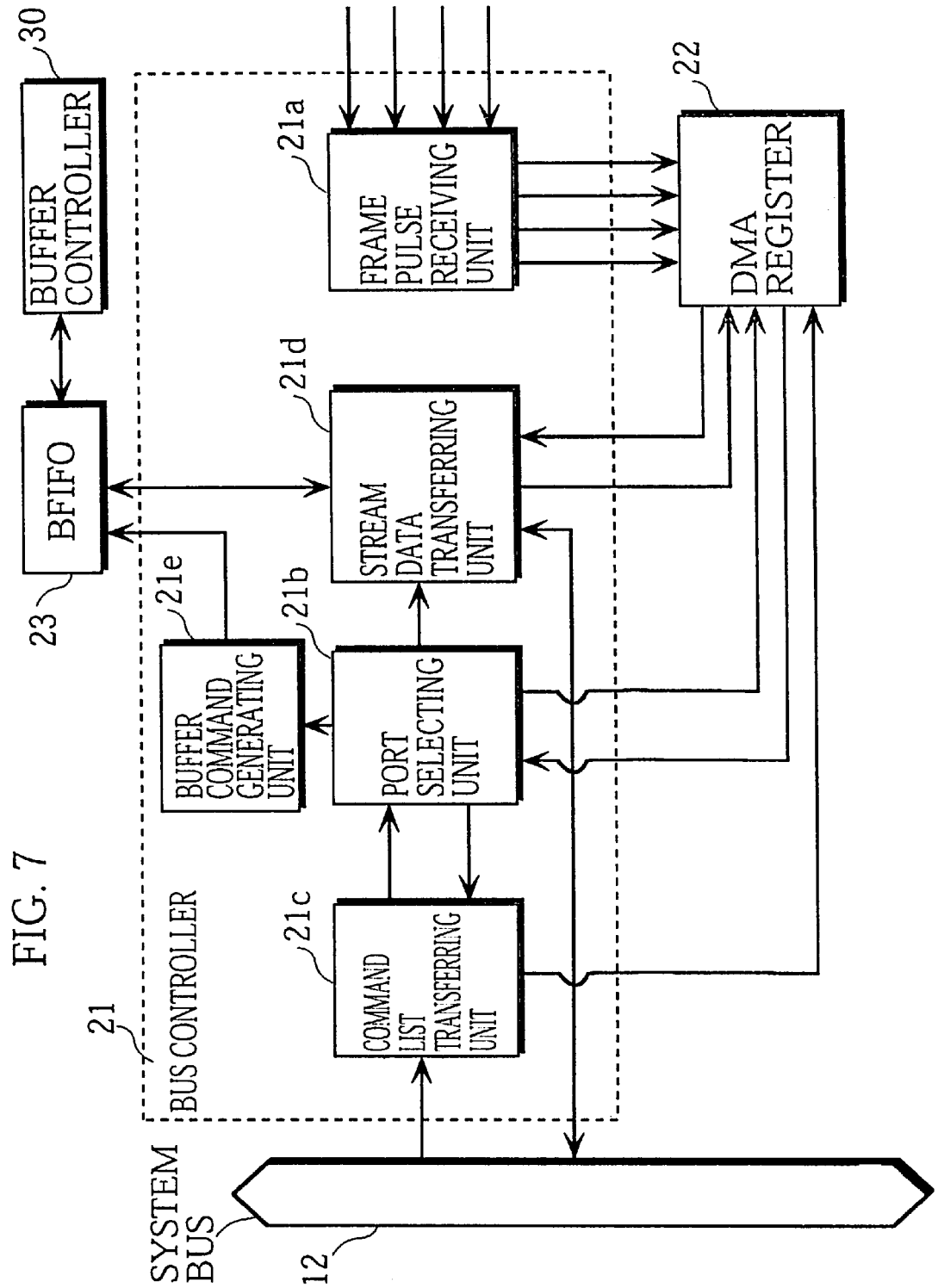
FIG. 7 shows the construction of bus controller 21.

FIG. 7 shows the construction of bus controller 21 included in DMA controller 20.

Bus controller 21 is composed of frame pulse receiving unit 21a, port selecting unit 21b, command list transferring unit 21c, stream data transferring unit 21d, and buffer command generating unit 21e.

Frame pulse receiving unit 21a receives a frame pulse from each port and sets an FP corresponding to the port from which the frame pulse is received.

Port selecting unit 21b clears the FP corresponding to a selected port, based on a DMA command bit sent from command list transferring unit 21c. Port selecting unit 21b, based on a predetermined order and a DMA command bit sent from command list transferring unit 21c, either selects a new port next in order out of the ports for which corresponding fields RUN and FP have been set but field DONE has not been set, or selects again the current port.

The command list transferring unit 21c, each time a port is selected by port selecting unit 21b, obtains a command list specified by a start address stored in a chain address counter corresponding to the selected port. The command list transferring unit 21c then sends a DMA command bit included in the obtained command list to port selecting unit 21b. The command list transferring unit 21c then sends a start address of a memory area included in the obtained command list to DMA address counter 22a. The command list transferring unit 21c sends a stream data size included in the obtained command list to DMA data counter 22b. The command list transferring unit 21c updates a start address stored in the corresponding chain address counter by replacing it by a start address next in order.

Stream data transferring unit 21d, each time a stream data size is transferred from the command list transferring unit 21c to DMA data counter 22b, DMA-transfers stream data of the data size received by DMA data counter 22b between the port selected by port selecting unit 21b and the memory area specified by the start address stored in DMA address counter 22a.

The buffer command generating unit 21e, each time a port is selected by port selecting unit 21b, generates, based on the selected port, the capacity of BFIFO 23, and the size of the stream data stored in DMA data counter 22b, a buffer command including information on a buffer to be selected and on the length of the data to be transferred, then transmits the generated buffer command to buffer controller 30.

Figure 8:
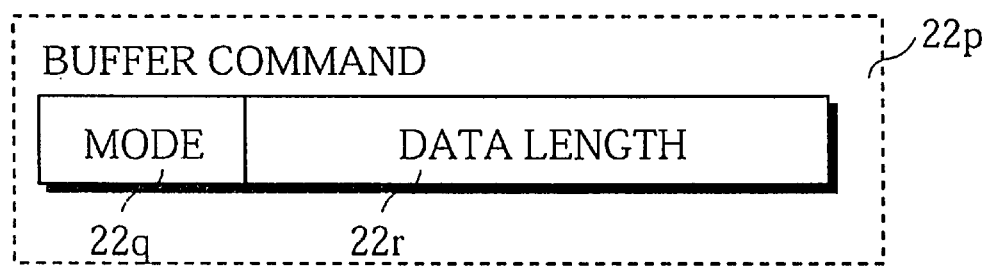
FIG. 8 shows the fields of buffer command 22p generated by the buffer command generating unit.

FIG. 8 shows the fields of buffer command 22p generated by the buffer command generating unit 21e.

The buffer command 22p, as shown in the drawing, is composed of fields MODE 22q and "data length" 22r.

The field MODE 22q specifies buffer identification information for identifying the buffer to which stream data is transferred and also specifies the direction of the data transfer.

The field "data length" 22r specifies the length of the data to be transferred.

Construction of BFIFO 23

Figure 9:
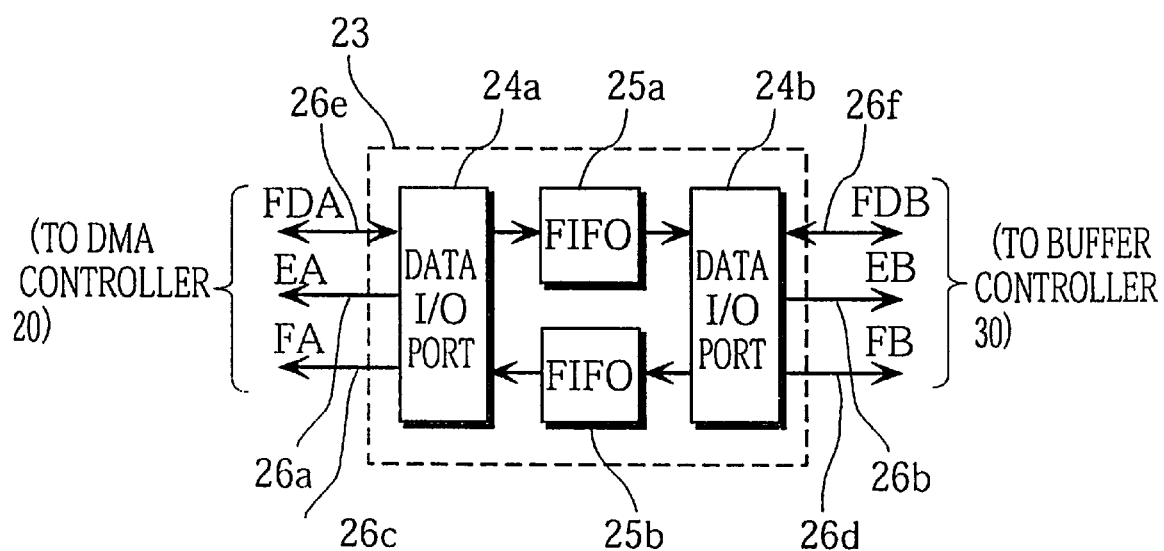
FIG. 9 shows the construction of BFIFO 23.

FIG. 9 shows the construction of BFIFO 23.

BFIFO 23, as shown in the drawing, is composed of FIFOs 25a and 25b, and data I/O ports 24a and 24b.

The drawing also shows empty flags EA 26a and EB 26b, full flags FA 26c and FB 26d, FDA 26e, and FDB 26f.

FIFO 25a is used for the data transfer from DMA controller 20 to buffer controller 30.

FIFO 25b is used for the data transfer from buffer controller 30 to DMA controller 20.

The data I/O port 24a selects a FIFO connecting to DMA controller 20.

The data I/O port 24b selects a FIFO connecting to buffer controller 30.

The empty flags EA 26a and EB 26b both indicate that the FIFO to be connected stores no data.

The full flags FA 26c and FB 26d both indicate that the FIFO to be connected is full with data to capacity.

FDA 26e is a bus connecting to DMA controller 20.

FDB 26f is a bus connecting to buffer controller 30.

It is possible with each area in the FIFO memory to perfectly perform a non-synchronous input/output.

As understood from the above description, it is possible for BFIFO 23 to store data during data transfer between DMA controller 20 and buffer controller 30 regardless of the data transfer direction since BFIFO 23 includes FIFO memories for both directions.

The capacity of each of FIFOs 25a and 25b in BFIFO 23 corresponds to the amount of data transferred during one burst transfer (continuous data transfer) between DMA controller 20 and memory 11. In the present embodiment, the capacity of each of FIFOs 25a and 25b is 32 words of data, where one word has 32 bits.

Construction of Buffer Interface 31

Figure 10:
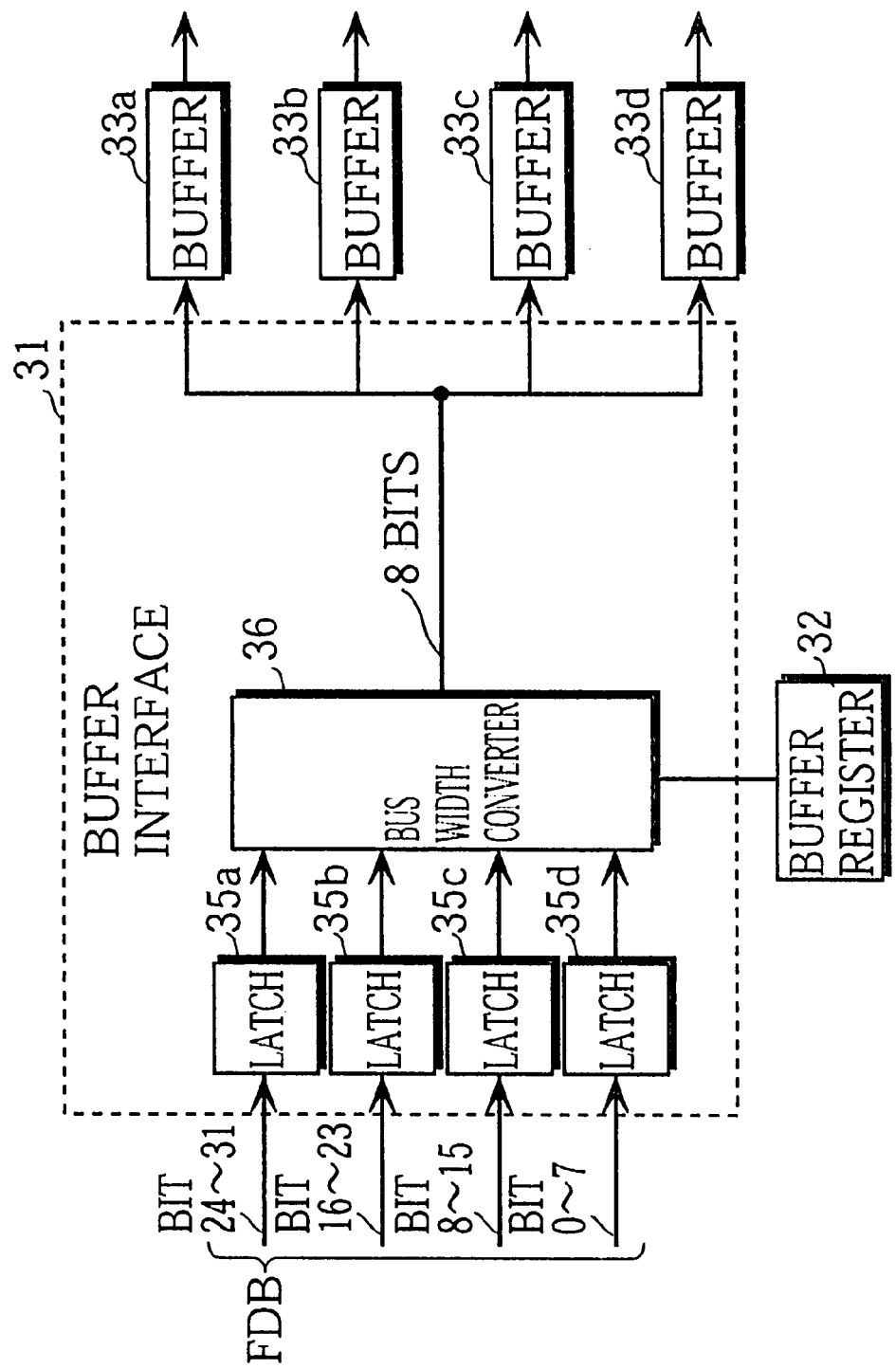
FIG. 10 shows the construction of buffer interface 31.

FIG. 10 shows the construction of buffer interface 31. The following description of this unit is based on a case in which stream data is transferred from BFIFO 23 to any of the buffers 33a, 33b, 33c, and 33d.

Buffer interface 31 is composed of latches 35a, 35b, 35c, and 35d, and bus width converter 36.

The drawing also shows buffers 33a, 33b, 33c, and 33d, and buffer register 32.

The latches 35a, 35b, 35c, and 35d each temporarily hold 8-bit data. In the present embodiment, 32-bit data transferred from BFIFO 23 via 32-bit bus FDB is divided into four pieces of 8-bit data and the four pieces of 8-bit data are respectively held temporarily by the latches.

Bus width converter 36 selects a buffer and converts the bus width from 32 bits to 8 bits. For example, bus width converter 36 selects buffer 33a and converts the bus width from 32 bits to 8 bits by sequentially transferring four pieces of 8-bit data held in latches 35a, 35b, 35c, and 35d.

Note that the buffer command including information on a buffer to be selected and on the length of the data to be transferred is transmitted from DMA controller 20 to buffer controller 30 before stream data is transferred. Bus width converter 36 then transfers stream data based on the buffer command.

Also note that the buffers as destinations of data transfers may be selected in units of 8 bits corresponding to the data held in the latches, instead of in units of 32 bits. Description is omitted for a case in which stream data is transferred from any of buffers 33a, 33b, 33c, and 33d to BFIFO 23 since the data transfer is achieved with the above procedure with the data transfer direction reversed.

Construction of Buffer Register 32

Figure 11:
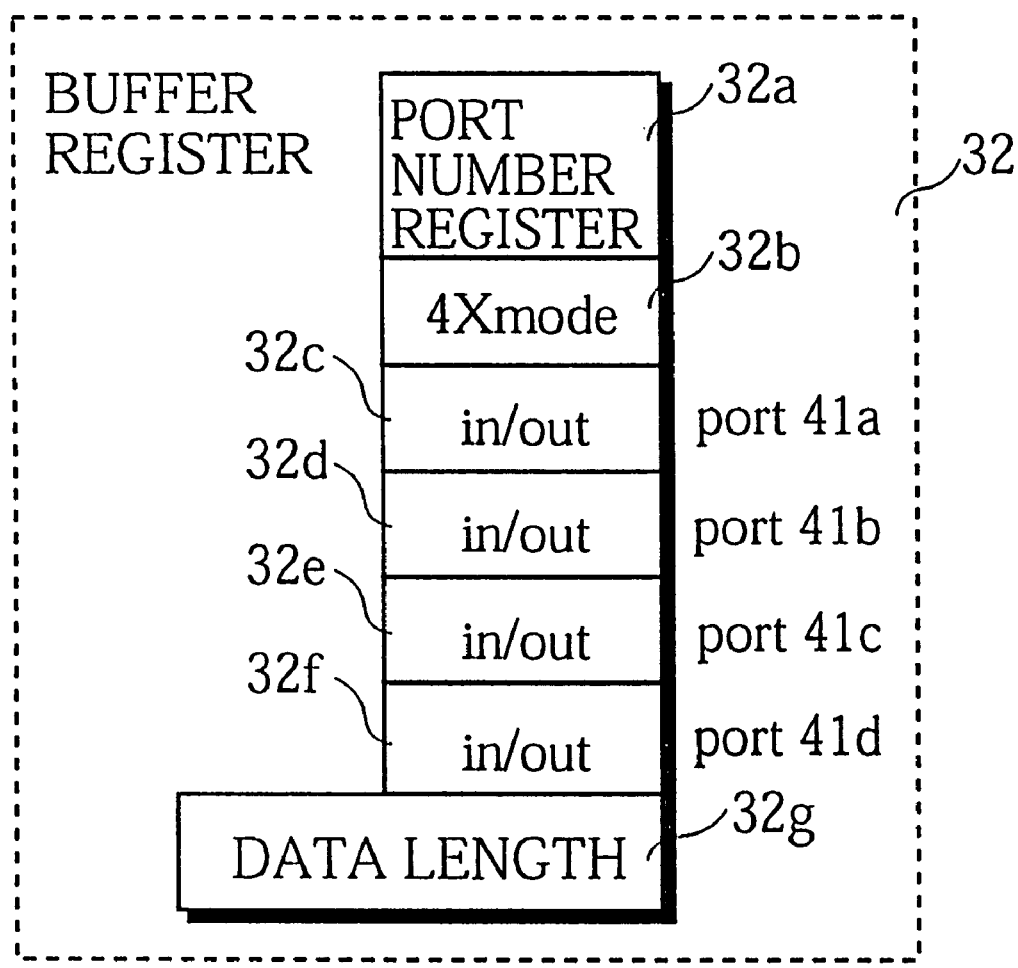
FIG. 11 shows the construction of buffer register 32.

FIG. 11 shows the construction of buffer register 32.

As shown in the drawing, buffer register 32 is composed of port number register 32a, 4Xmode 32b, in/out 32c, in/out 32d, in/out 32e, and in/out 32f, and data length 32g.

Port number register 32a stores the port number of a port in which the bus width is converted.

The 4Xmode 32b is set only when the bus width is converted in the quadruple-speed mode.

The in/out 32c–32f indicate respective data transfer directions for buffers 33a–33d.

The data length 32g stores the length of the stream data for which the bus width is converted.

Each of the above registers is set by buffer command 22p shown in FIG. 8.

Buffers 33a, 33b, 33c, and 33d

Figure 12:
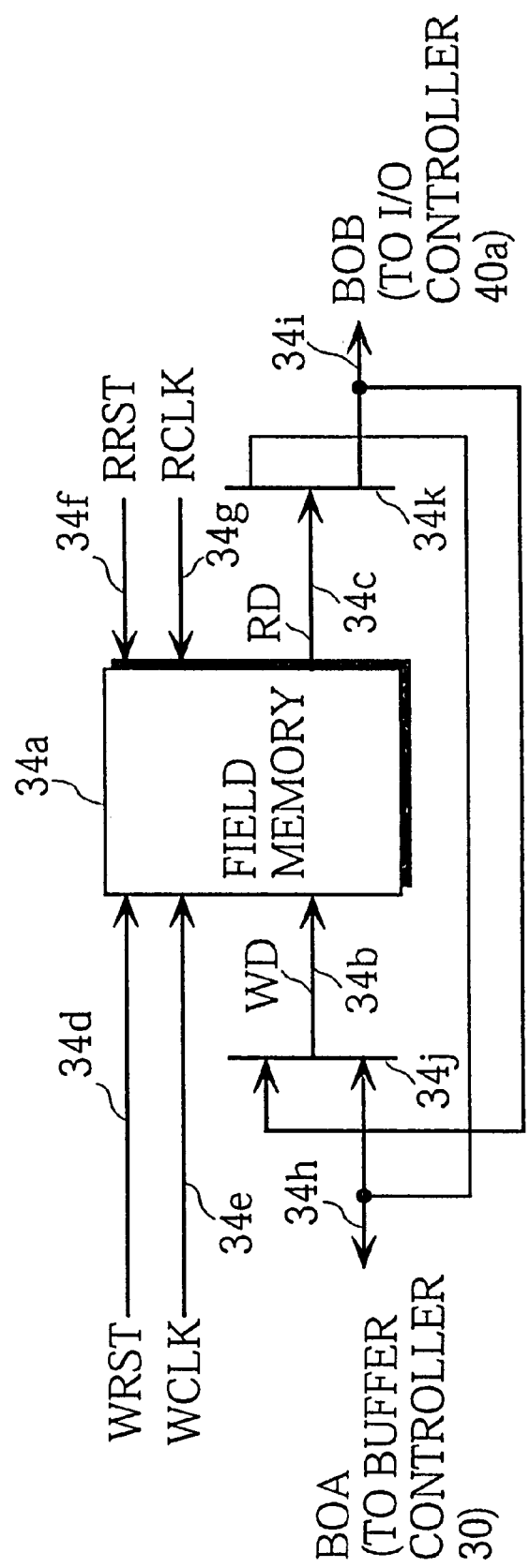

FIG. 12 shows the construction of buffer 33a. Note that description of buffers 33b, 33c, and 33d is omitted since they have similar construction as buffer 33a.

The following description is based on a case where field memory 34a is used.

The drawing also shows WD 34b which is a data bus for writing, RD 34c which is a data bus for reading, WRST 34d which is a reset for writing, WCLK 34e which is a clock for writing, RRST 34f which is a reset for reading, RCLK 34g which is a clock for reading, BOA 34h, BOB 34i, gate 34j for switching the write buses, and gate 34k for switching the read buses.

It is possible with the field memory to deal with data with First In First Out method, but is not possible with each area in the field memory to perfectly perform a non-synchronous input/output. Accordingly, when data is transferred, the reading and writing data in the field memory overlaps in a certain cycle. In the present embodiment, a series of stream data is transferred and the data transfer is performed continuously. Therefore, data is transferred while the data reading and writing overlap each other in a frame pulse cycle.

The data stored in field memory 34a is written via WD 34b and is read via RD 34c.

WRST 34d resets the writing position in WD 34b for each frame and data is written into WD 34b in synchronization with WCLK 34e.

RRST 34f resets the reading position in RD 34c for each frame and data is read from RD 34c in synchronization with RCLK 34g.

BOA 34h is connected to buffer controller 30.

BOB 34i is connected to I/O controller 40a.

Gates 34j and 34i switch buses BOA 34h and BOB 34i for the two-way data transfer between buffer controller 30 and I/O controller 40a.

As described above, buffer 33a determines the direction of data transfer by switching buses. It enables the continuous stream data transfer between buffer controller 30 and I/O controller 40a.

The capacity of field memory 34a in buffer 33a corresponds to the amount of data included in two or three frames.

In the present embodiment, the capacity of field memory 34a is 250 KB corresponding to two frames.

Construction of FPs 44a, 44b, 44c, and 44d

Figure 13:
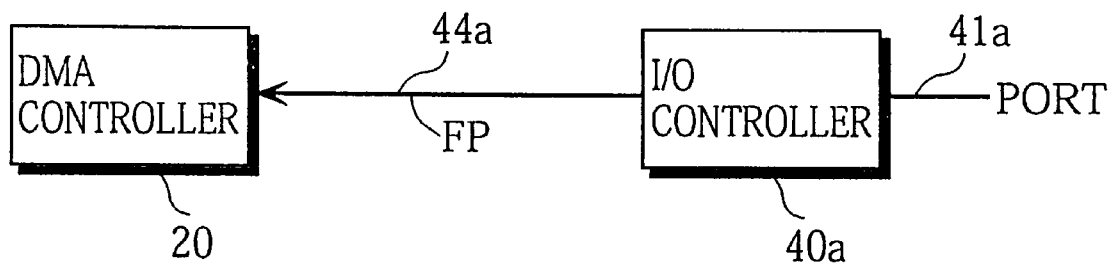

FIG. 13 shows control line FP 44a. Note that description of FPs 44b, 44c, and 44d is omitted since they have similar construction as FP 44a.

A frame pulse received from I/O controller 40a via port 41a is transferred to DMA controller 20 via control line FP 44a, which sets FP 22o shown in FIG. 6B.

Operation

In the data transfer system shown in FIG. 2, stream data is transferred from HDDs 14a, 14b, 14c, and 14d via multi-stream interface 15, as described below.

Operation of CPU 10

Figure 14:
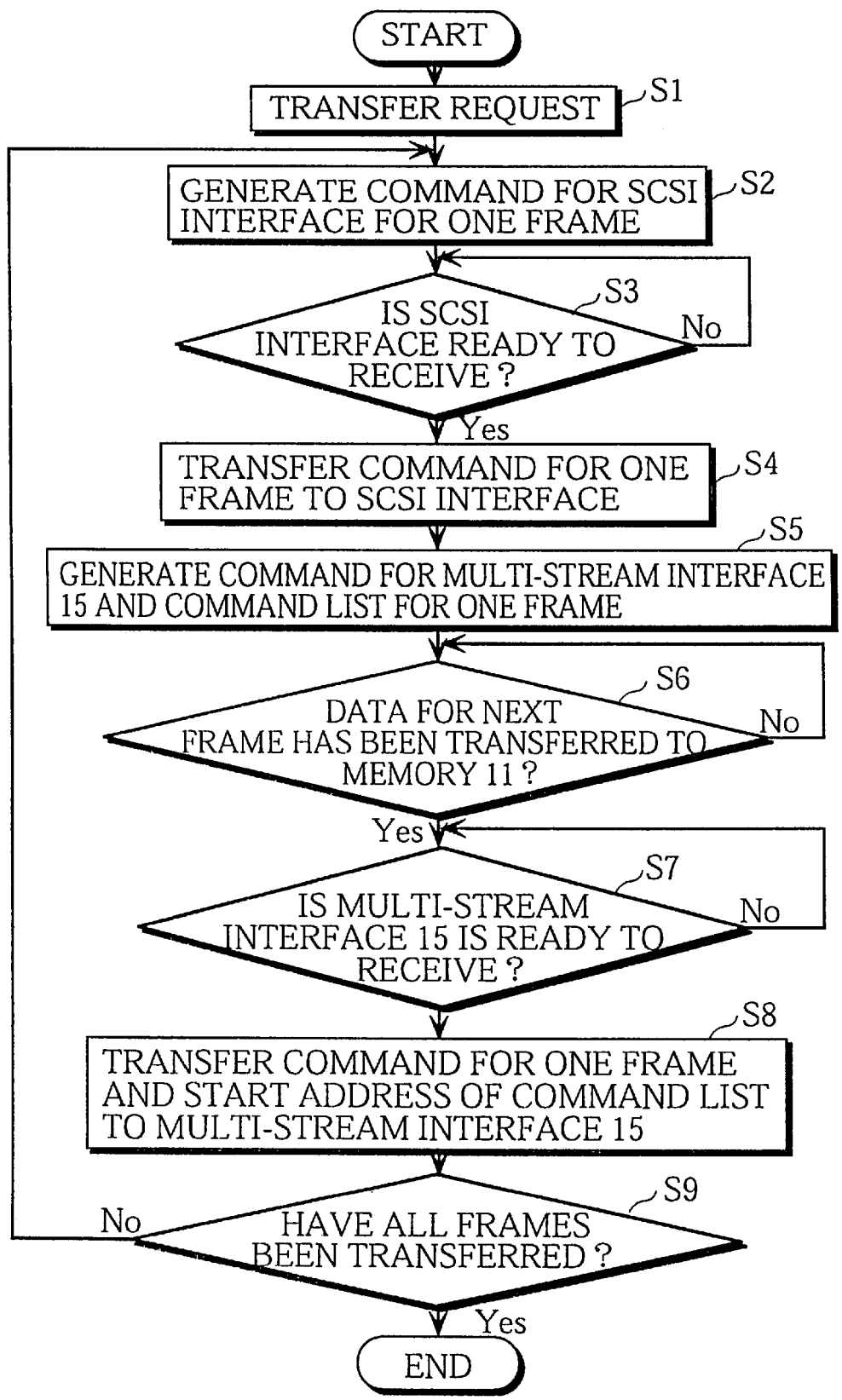
FIG. 14 is a flowchart of the operation of CPU 10 when stream data is transferred in the data transfer system of the present invention.

FIG. 14 is a flowchart of the operation of CPU 10 when stream data is transferred in the data transfer system of the present invention.

CPU 10 receives a data transfer request sent from a user requesting a piece of stream data to be transferred (step S1).

CPU 10 generates an HDD command for DMA-transferring the specified piece of stream data from HDD 14a, 14b, 14c, or 14d to memory 11 in one frame unit, and temporarily stores the generated HDD command in memory 11 (step S2).

CPU 10 waits until SCSI interface 13 is ready to receive the HDD command (step S3).

CPU 10 transfers the HDD command generated in step S2 to SCSI interface 13 (step S4).

CPU 10 generates commands for respective external units and a command list for DMA-transferring the one frame of the piece of stream data from memory 11 to a specified external unit, and stores the generated commands and command list into memory 11 (step S5).

CPU 10 waits until SCSI interface 13 has DMA-transferred one frame of the specified piece of stream data from HDD 14a, 14b, 14c, or 14d to memory 11 (step S6).

CPU 10 waits until multi-stream interface 15 is ready to receive the commands for respective external units (step S7).

CPU 10 transfers the commands for respective external units generated in step S5 from memory 11 to multi-stream interface 15 (step S8).

CPU 10 judges whether all frames of the specified piece of stream data have been transferred. CPU 10 terminates the operation if it judges so; CPU 10 returns to step S2 if it does not judge so (step S9).

CPU 10 executes the above operations in parallel for each external unit connected to the data transfer system.

Note that the buffer areas in memory 11 are specified by logical addresses for users and are specified by physical addresses during data transfer. That means the command list is generated during data transfer using the physical addresses for 4 KB-areas.

Generally, the size of each piece of data included in the command list to be DMA-transferred is 4 KB which corresponds to one page. However, some pieces of data may be short of 4 KB. For example, when one frame of the stream data consists of 10,000 bytes, one frame is divided into three parts respectively consisting of 4,096 bytes, 4,096 bytes, and 1,808 bytes, the last part being short of 4 KB.

Therefore, the buffer areas are locked for preventing the OS from performing the page out operation.

Operation of SCSI Interface 13

SCSI interface 13, on receiving a command from CPU 10, DMA-transfers the specified piece of stream data from HDD 14a, 14b, 14c, or 14d to memory 11 in one frame unit. Detailed description of the operation of SCSI interface 13 is omitted since it is similar to that of the conventional DMA transfer apparatus.

Operation of Multi-Stream Interface 15

Multi-stream interface 15, on receiving from CPU 10 a command to DMA-transfer stream data from memory 11 to a specified external unit in one frame unit and also receiving an address of a command list, reads the command list from memory 11 based on the address, and executes the DMA transfer according to the read command list. The operation of multi-stream interface 15 is described in detail later.

Methods for Managing Buffers

The following is a description of a method for managing the buffers in units of frames and a method, called double-buffer method, used for managing the buffer areas in memory 11.

Video data is composed of a series of frames. Generally 30 frames of video data correspond to the images reproduced in one second. Accordingly, when video data is reproduced at a rate of 30 Mbps for example, the data size of one frame is 125 KB (1 Mb).

In the method for managing the buffers in units of frames, the stream data of one frame is temporarily stored in the buffer areas in memory 11 before the stream data of one frame is transferred to multi-stream interface 15.

In the double-buffer method, SCSI interface 13 and multi-stream interface 15 each use one buffer assigned to them. The use of one buffer is synchronized with the other in one-frame cycle. This enables two interfaces to process in parallel.

The stream data is input from each port with the above procedure and data transfer direction reversed. The stream data input from each port is temporarily stored in the buffer areas in memory 11 by multi-stream interface 15 and then stored in HDD 14a, 14b, 14c, or 14d by SCSI interface 13.

Data Transfer on System Bus 12

When a PCI local bus, for example, is used as system bus 12, the memory address and data are multiplexed. As a result, an address is first output onto system bus 12 to specify a location in memory 11. A plurality pieces of data are then transferred following the address and stored in memory 11 in areas starting from the location specified by the address. Such a data transfer is called the burst transfer. In one burst transfer, one address and data are transferred in order. Accordingly, the address only specifies a location in a memory where data starts to be stored. It is possible during one bus transaction to store data into areas in the memory of successive addresses. In case a PCI local bus is used, for example, the length of one burst transfer is more than or equal to a value specified by a latency timer dedicated to a device on the PCI local bus. In the present embodiment, the length of one burst transfer is equal to the capacity of BFIFO 23. Each bus transaction on the PCI local bus starts the access after a master device of the bus outputs a bus request (REQ) and receives a bus use permission (GNT) in response.

In general, in the burst transfer of stream data (when one frame consists of 125 KB, for example), data is not DMA-transferred from successive 125 KB-areas in order. Data is transferred in units of several to several tens of data units. With such an arrangement, even if a plurality of devices (e.g., CPU 10, memory 11, SCSI interface 13, multi-stream interface 15, etc.) are connected to the system bus 12, the devices can use the system bus 12 in the order of the bus requests output from the devices to the system bus 12. This enables an effective use of the system bus 12 during the data transfer. Note that the above process is executed regardless of the input or output of the stream data.

Operation of Multi-Stream Interface 15

Operation of Bus Controller 21

Figure 15:
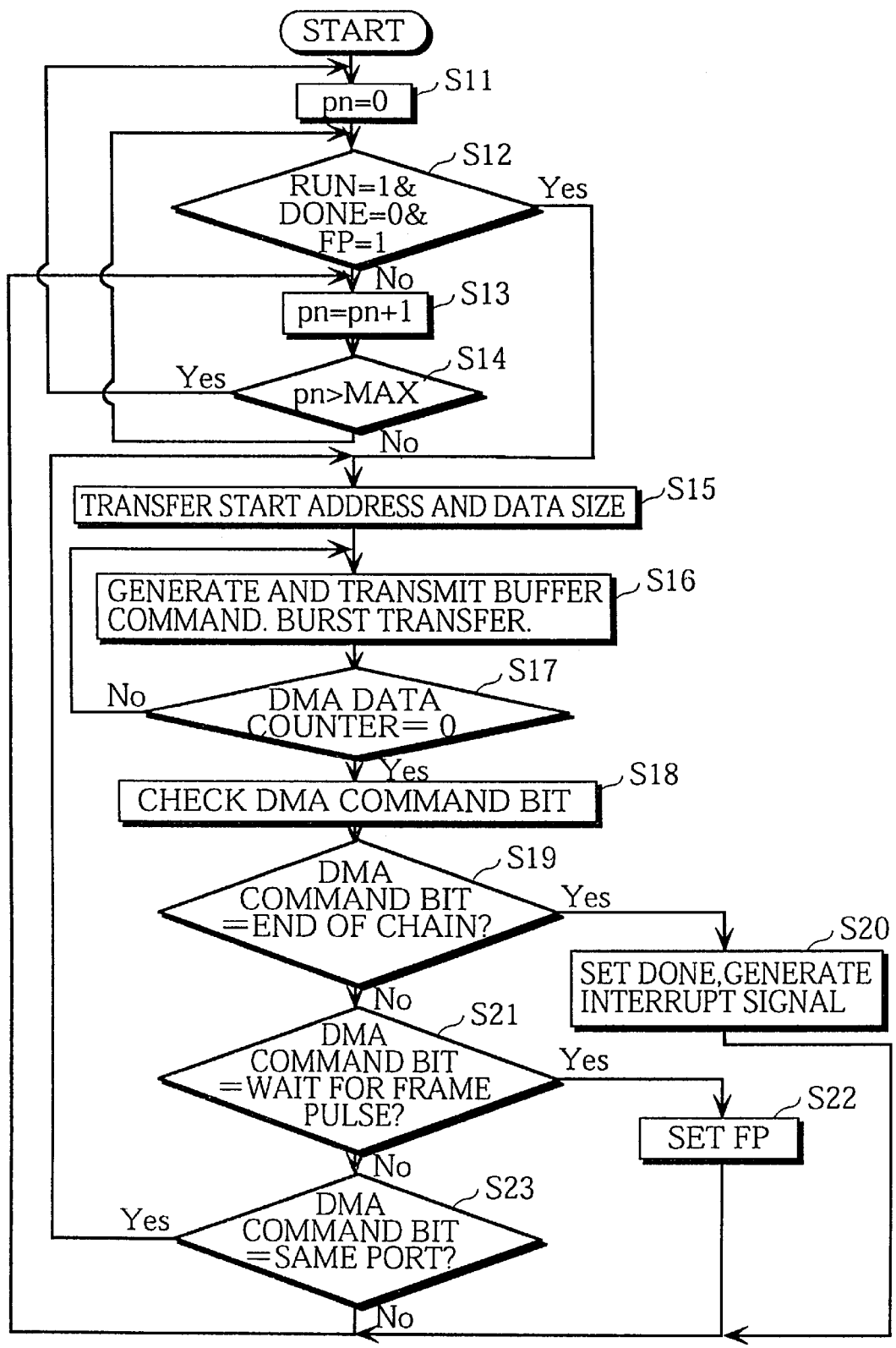
FIG. 15 is a flowchart of the operation of bus controller 21 when stream data is transferred in the data transfer system of the present invention.

FIG. 15 is a flowchart of the operation of bus controller 21 when stream data is transferred in the data transfer system of the present invention. The operation of bus controller 21 is described below with reference to FIGS. 2, 3A, 3B, 4, 5, 6A, 6B, 8, and 11.

In this operation example, the stream data shown in FIG. 3A and the chain list shown in FIG. 3B are prestored in memory 11. Also, when the field DONE 22m of control register 22g corresponding to port 41a is "1," command list address A68a indicating the start address of command lists A 64a (shown in FIG. 3B) is transferred from CPU 10 to chain address counter 22c, and the fields RUN 22l, DONE 22m, IO 22n, and FP 22o of control register 22g are respectively set to "1," "0," "0," and "0." First, port number pn is initialized. Note that ports 41a, 41b, 41c, and 41d respectively correspond to port numbers 0, 1, 2, and 3. In this initialization, port number pn is set to initial value "0" (step S11).

It is judged whether the fields RUN, DONE, and FP of the control register corresponding to port number pn are respectively "1," "0," and "1." Here, RUN=1 indicates that a DMA transfer is activated for the corresponding port. DONE=0 indicates that a DMA transfer for the corresponding port has not been completed. FP=1 indicates that a frame pulse has been received from the corresponding port (step S12).

When any of the above conditions is not satisfied, the port number pn is incremented so that a judgment is made on the next port (step S13).

When the port number pn is greater than the maximum port number, control goes to step S11 to initialize the port number pn; when the port number pn is equal to or smaller than the maximum port number, control goes to step S12 to make a judgement on the contents of the control register (step S14).

When all the conditions are satisfied in step S12, bus controller 21 obtains a command list specified by a command list address stored in the chain address counter of the port corresponding to port number pn. Bus controller 21 transfers the start address included in the command list to the DMA address counter, transfers the stream data size included in the command list to the DMA data counter, and updates the command list address stored in the chain address counter to the next command list address.

In the present case, when all the conditions are satisfied in step S12, bus controller 21 obtains command list A 64a specified by command list address A 68a stored in chain address counter 22c of port 41a corresponding to port number "0." Bus controller 21 transfers the start address included in the command list A 64a to DMA address counter 22a, transfers data size A 67a included in the command list A 64a to DMA data counter 22b, and updates command list address a 68a stored in the chain address counter 22c to the next command list address, B 68b (step S15).

Bus controller 21 generates buffer command 22p based on port number pn, content of the control register of the port corresponding to port number pn, capacity of BFIFO 23, and content of DMA data counter 22b. Bus controller 21 then transfers the buffer command 22p to buffer controller 30 after data length 32g has become "0." Bus controller 21 transfers the stream data with the burst transfer between BFIFO 23 and a buffer area in memory 11 specified by the start address stored in DMA address counter 22a. Bus controller 21 then increments the start address stored in DMA address counter 22a and decrements the data size stored in DMA data counter 22b, based on the transferred amount of stream data.

In the present case, for example, bus controller 21 generates buffer command 22p based on port number "0," contents of control register 22g of port 41a, capacity of BFIFO 23, and content of DMA data counter 22b. Bus controller 21 then transfers the buffer command 22p to buffer controller 30 after data length 32g has become "0." Bus controller 21 transfers the stream data of 32 words with the burst transfer between BFIFO 23 and a buffer area in memory 11 specified by the start address stored in DMA address counter 22a. Bus controller 21 then increments the DMA address counter 22a by 32 words and decrements the DMA data counter 22b by 32 words (step S16).

Bus controller 21 judges whether the data size stored in DMA data counter 22b is "0" (step S17).

When the data size is "0," bus controller 21 checks the DMA command bit included in the command list obtained in step S15 to determine the next operation in the DMA transfer. In the present case, bus controller 21 checks DMA command bit A 66a (step S18).

When the DMA command bit is "end of chain" 66f, bus controller 21 sets DONE and generates an interrupt signal, then returns to step S13 (steps S19 and S20).

When the DMA command bit is "wait for frame pulse" 66g, bus controller 21 resets FP and returns to step S13 (steps S21 and S22).

When the DMA command bit is "same port" 66d, "bus controller 21 returns to step S15. When the DMA command bit is "change port" 66e, bus controller 21 returns to step S13 (step S23).

Operation of Buffer Controller 30

Figure 16:
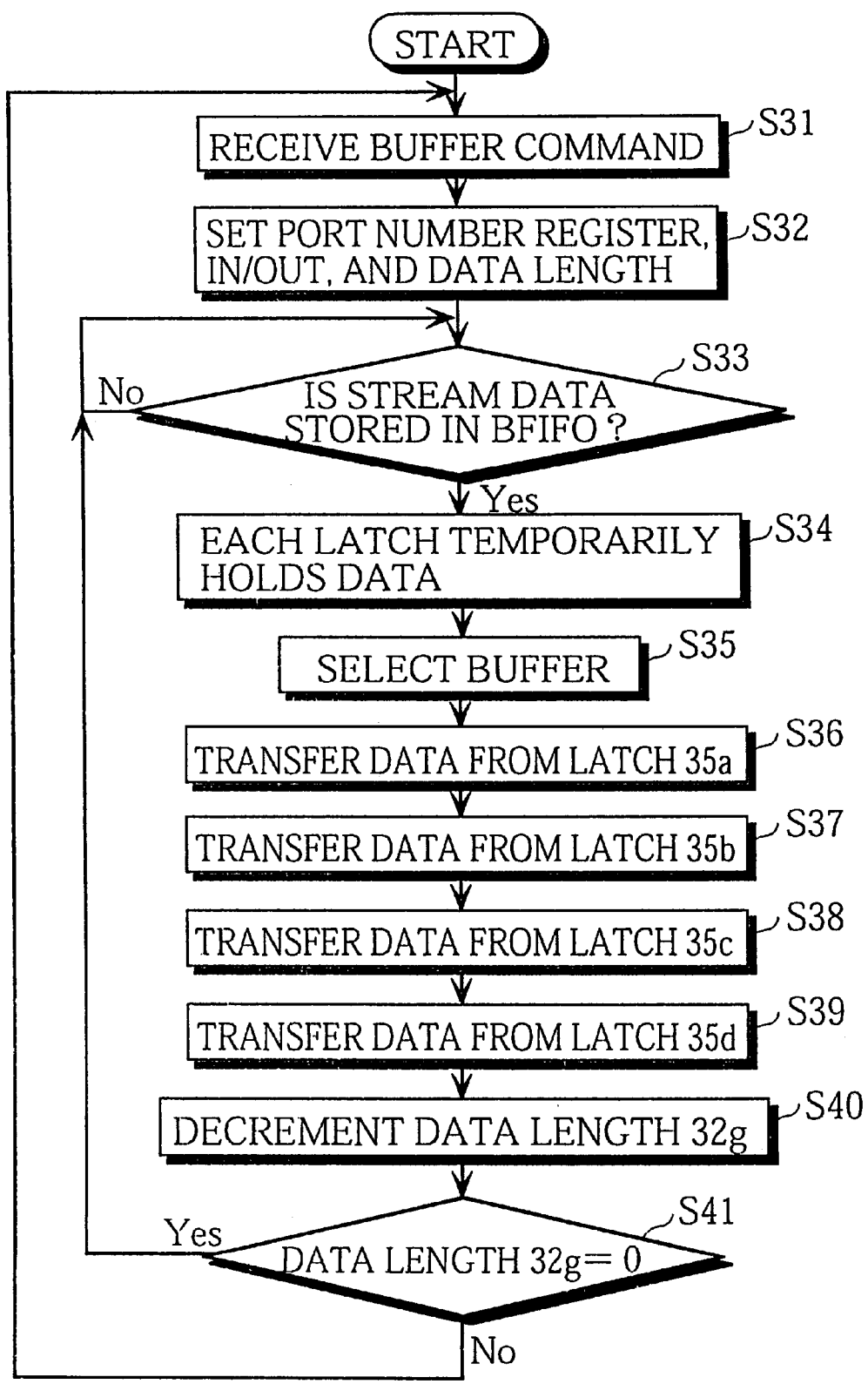
FIG. 16 is a flowchart of the operation of buffer controller 30 for the bus conversion for stream data in the data transfer system of the present invention.
Figure 18A:
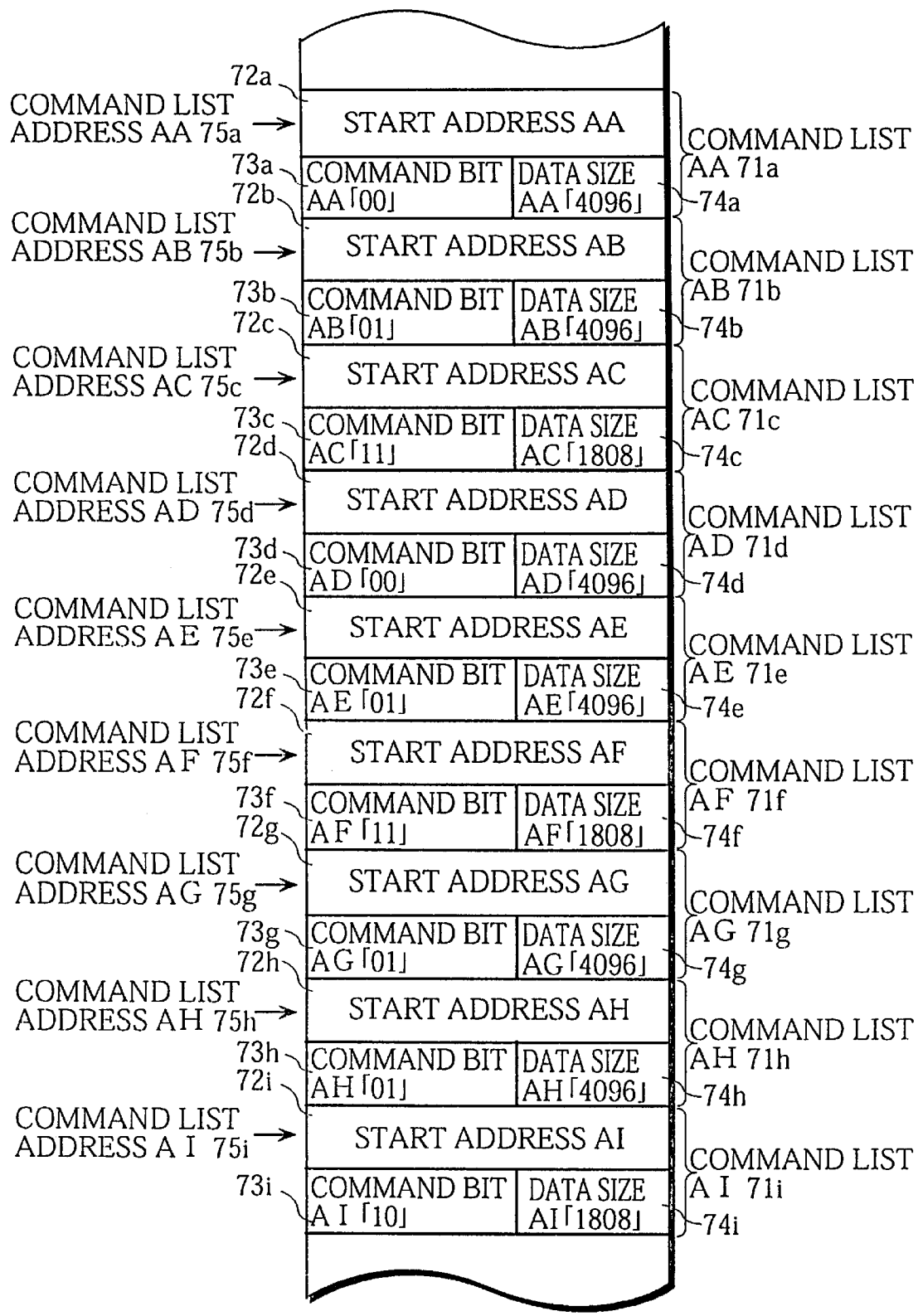
Figure 18B:
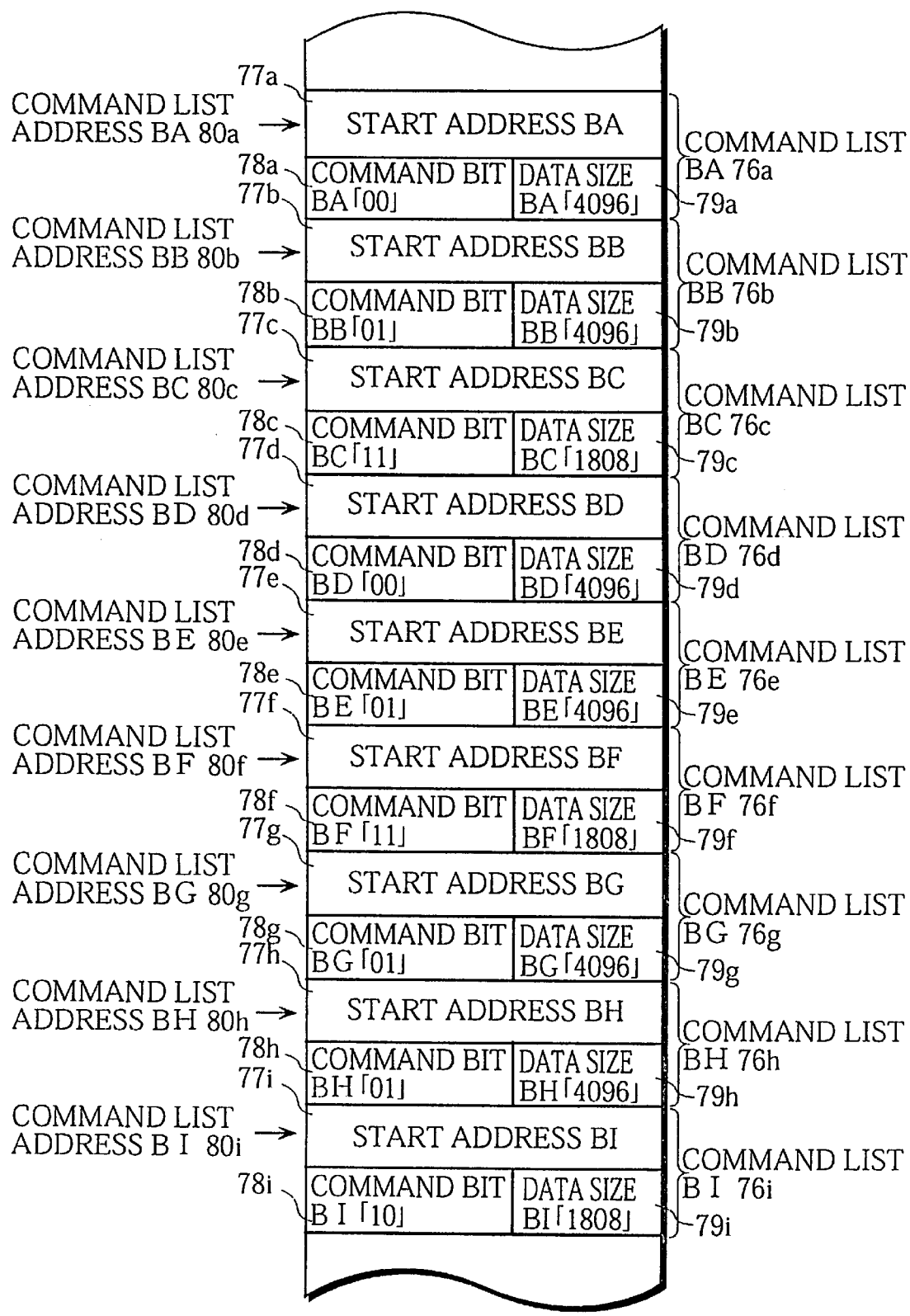
FIG. 18B shows the chain lists used for DMA-transferring the stream data to port 41b.
Figure 18C:
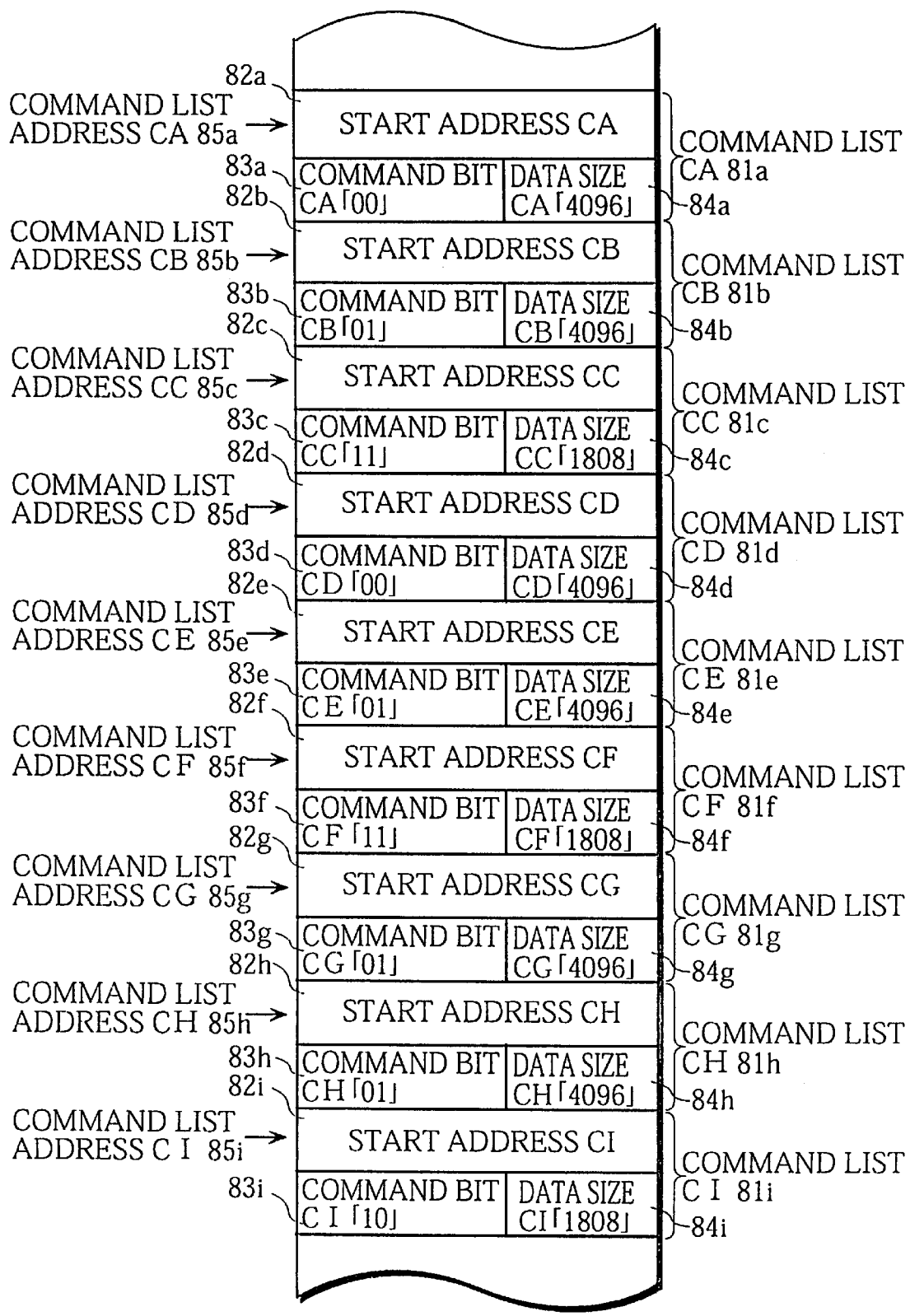
FIG. 18C shows the chain lists used for DMA-transferring the stream data to port 41c.
Figure 18D:
FIG. 18D shows the chain lists used for DMA-transferring the stream data to port 41d.

FIG. 16 is a flowchart of the operation of buffer controller 30 for the bus conversion for stream data in the data transfer system of the present invention. The operation of buffer controller 30 is described below with reference to FIGS. 5, 8, 10, and 11.

Buffer interface 31, on receiving buffer command 22p from bus controller 21 (step S31), sets port number register 32a to a number corresponding to the port, sets the "in/out" corresponding to the port to indicate the direction of the data transfer, and sets data length 32g based on data length 22r included in buffer command 22p (step S32).

When bus controller 21 transfers stream data with the burst transfer to BFIFO 23, buffer interface 31 starts performing the bus conversion asynchronously with DMA controller 20 (step S33).

Latches 35a, 35b, 35c, and 35d each temporarily hold 8-bit data. In the present case, latches 35a, 35b, 35c, and 35d each temporarily hold 8-bit data which is a part of 32-bit data transferred from BFIFO 23 via 32-bit bus FDB (step S34).

Bus width converter 36 selects a buffer and converts the bus width from 32 bits to 8 bits. In the present case, bus width converter 36 selects buffer 33a (step S35), and converts the bus width from 32 bits to 8 bits by sequentially transferring four pieces of 8-bit data held in latches 35a, 35b, 35c, and 35d (steps S36–S39).

When one bus width conversion is complete, the value of data length 32g is decremented by the amount of transferred data (step S40).

Buffer controller 30 judges whether the value of data length 32g is "0." When the data length is "0," control returns to step S31; when the data length is not "0," control returns to step S33 (step S41).

nX Input/Output Operation

Concerning to the nX input/output, FIG. 5 shows connection to 4Xport 42 or to xnmode 43. This operation is basically the same as the asynchronous multi-stream DMA transfer described earlier but has the following differences. The 4Xmode 32b in buffer register 32 shown in FIG. 11 is set to the quadruple-speed mode by the buffer command.

The control line xnmode 43 conveys the 4Xmode to I/O controllers 40a, 40b, 40c, and 40d so that each port is replaced by 4Xport 42.

For example, when data is input from an external unit, a signal from 4Xport 42 is sequentially input to a different I/O controller for each frame.

The connection for the quadruple-speed input/output is described above. When two ports are connected, the double-speed input/output is achieved; when eight ports are connected, the 8X input/output is achieved. Accordingly, the number of ports is determined based on the necessity.

Simultaneous Operation of Ports

FIG. 17 shows a simultaneous operation of a plurality of ports when DMA controller 20 of the present invention is used.

FIGS. 18A–18D show chain lists used for DMA-transferring the stream data respectively to ports 41a–41d.

The simultaneous operation of a plurality of ports is described below with reference to FIGS. 18A, 18B, 18C, and 18D.

Note that in the present embodiment, memory 11, before a DMA transfer command for a port is transferred, prestores the chain lists shown in FIGS. 17, 18A, 18B, 18C, and 18D and the stream data specified by the chain lists.

Bus controller 21 receives frame pulse 91a from port 44a after CPU 10 transfers the DMA transfer command to port 44a (time t1).

Bus controller 21, on receiving frame pulse 91a, starts DMA transfer A 95a, based on command list AA 71a, for transferring 4,096 bytes of stream data starting from the start address AA 72a (time t1–).

After the completion of DMA transfer A 95a, bus controller 21 starts DMA transfer A 95b, based on command list AB 71b which is the next command list of the same port 44a, for transferring 4,096 bytes of stream data starting from the start address AB 72b because DMA command bit AA 73a for port 44a is "00" (time t2–).

Bus controller 21 receives frame pulse 92a from port 44b after CPU 10 transfers the DMA transfer command to port 44b (time t3).

After the completion of DMA transfer A 95b, bus controller 21 starts DMA transfer B 96a, based on command list BA 76a for the next port 44b, for transferring 4,096 bytes of stream data starting from the start address BA 77b because DMA command bit AB 73b for port 44a is "01" (time t4–).

After the completion of DMA transfer B 96a, bus controller 21 starts DMA transfer B 96b, based on the next command list BB 76b for the same port 44b, for transferring 4,096 bytes of stream data starting from the start address BB 77b because DMA command bit BA 78a for port 44b is "00" (time t5–).

After the completion of DMA transfer B 96b, bus controller 21 attempts to start a DMA transfer for the next port because DMA command bit BB 78b for port 44b is "01." However, bus controller 21 skips ports 44c and 44d since the ports have not received the DMA transfer command. Accordingly, bus controller 21 starts DMA transfer A 95c, based on command list AC 71c for port 44a, for transferring 1,808 bytes of stream data starting from the start address AC 72c (time t6–).

After the completion of DMA transfer A 95c, bus controller 21 starts DMA transfer B 96c, based on command list BC 76c for the next port 44b, for transferring 1,808 bytes of stream data starting from the start address BC 77c because DMA command bit AC 73c for port 44a is "11," indicating "wait for frame pulse A" (time t7–).

After the completion of DMA transfer B 96c, bus controller 21 attempts to start a DMA transfer for the next port because DMA command bit BC 78c for port 44b is "11" indicating "wait for frame pulse B." However, bus controller 21 skips ports 44c and 44d since the ports have not received the DMA transfer command. Bus controller 21 also skips port 44a since port 44a is waiting for frame pulse A and skips port 44b since port 44b is waiting for frame pulse B (time t8).

Bus controller 21 receives frame pulse 91b from port 44a (time t9).

Bus controller 21 starts DMA transfer A 95d with an operation similar to the one in "time t1–" (time t9–).

Bus controller 21 receives frame pulse 93a from port 44c after CPU 10 transfers the DMA transfer command to port 44c (time t10).

After the completion of DMA transfer A 95d, bus controller 21 starts DMA transfer A 95e with an operation similar to the one in "time t2–" (time t11–).

Bus controller 21 receives frame pulse 92b from port 44b (time t12).

After the completion of DMA transfer A 95e, bus controller 21 starts DMA transfer B 96d with an operation similar to the one in "time t4–" (time t13–).

After the completion of DMA transfer B 96d, bus controller 21 starts DMA transfer B 96e with an operation similar to the one in "time t5–" (time t14–).

After the completion of DMA transfer B 96e, bus controller 21 starts DMA transfer B 96a, based on command list CA 81a for the next port 44c, for transferring 4,096 bytes of stream data starting from the start address CA 82a because DMA command bit BE 78e for port 44b is "01" (time t15–).

After the completion of DMA transfer C 97a, bus controller 21 starts DMA transfer C 97b, based on command list CB 81b which is the next command list of the same port 44c, for transferring 4,096 bytes of stream data starting from the start address CB 82b because DMA command bit CA 83a for port 44c is "00" (time t16–).

After the completion of DMA transfer C 97b, bus controller 21 attempts to start a DMA transfer for the next port because DMA command bit CB 83b for port 44c is "01." However, bus controller 21 skips port 44d since the port has not received the DMA transfer command. Accordingly, bus controller 21 starts DMA transfer A 95f, based on command list AF 71f for port 44a, for transferring 1,808 bytes of stream data starting from the start address AF 72f (time t17–).

After the completion of DMA transfer A 95f, bus controller 21 starts DMA transfer B 96f with an operation similar to the one in "time t7–" (time t18–).

After the completion of DMA transfer B 96f, DMA command bit BF 78f for port 44b is "11" indicating "wait for frame pulse B." Accordingly, bus controller 21 starts DMA transfer C 97c, based on command list CC 81c for the next port 44c, for transferring 1,808 bytes of stream data starting from the start address CC 82c (time t19–).

After the completion of DMA transfer C 97c, bus controller 21 attempts to start a DMA transfer for the next port because DMA command bit CC 83c for port 44c is "11" indicating "wait for frame pulse C." However, bus controller 21 skips port 44d since the port has not received the DMA transfer command. Bus controller 21 also skips ports 44a, 44b, and 44c since they are respectively waiting for frame pulses A, B, and C (time t20–).

Bus controller 21 receives frame pulse 94a from port 44d after CPU 10 transfers the DMA transfer command to port 44d (time t21).

After the completion of DMA transfer D 98a, bus controller 21 starts DMA transfer D 98b, based on command list DB 86*b* which is the next command list of the same port 44*d*, for transferring 4,096 bytes of stream data starting from the start address DB 87*b* because DMA command bit DA 88*a* for port 44*d* is "00" (time t22–).

After the completion of DMA transfer D 98*b*, bus controller 21 attempts to start a DMA transfer for the next port because DMA command bit DB 88*b* for port 44*d* is "01." However, bus controller 21 skips ports 44*a*, 44*b*, and 44*c* since they are respectively waiting for frame pulses A, B, and C. Accordingly, bus controller 21 starts DMA transfer D 98*c*, based on command list DC 86*c* for the next port 44*d*, for transferring 1,808 bytes of stream data starting from the start address DC 87*c* (time t23–).

After the completion of DMA transfer D 98*c*, bus controller 21 attempts to start a DMA transfer for the next port because DMA command bit DC 88*c* for port 44*d* is "11" indicating "wait for frame pulse D." However, bus controller 21 skips ports 44*a*, 44*b*, 44*c*, and 44*d* since they are respectively waiting for frame pulses A, B, C, and D (time t24–).

Bus controller 21 starts DMA transfer A 95*g* with an operation similar to the one in "time t1–" (time t25–).

Bus controller 21 receives frame pulse 93*b* from port 44*c* (time t26).

After the completion of DMA transfer A 95*g*, bus controller 21 attempts to start a DMA transfer for the next port because DMA command bit AG 73*g* for port 44*a* is "01." However, bus controller 21 skips port 44*b* since it is waiting for frame pulse B. Accordingly, bus controller 21 starts DMA transfer C 97*d*, based on command list CD 81*d* for the next port 44*c*, for transferring 4,096 bytes of stream data starting from the start address CD 82*d* (time t27–).

Bus controller 21 receives frame pulse 92*c* from port 44*b* (time t28).

After the completion of DMA transfer C 97*d*, bus controller 21 starts DMA transfer C 97*e* with an operation similar to the one in "time t15–" (time t29–).

After the completion of DMA transfer C 97*e*, bus controller 21 attempts to start a DMA transfer for the next port because DMA command bit CE 83*e* for port 44*c* is "01." However, bus controller 21 skips port 44*d* since it is waiting for frame pulse D. Accordingly, bus controller 21 starts DMA transfer A 95*h*, based on command list AH 71*h* for the next port 44*a*, for transferring 4,096 bytes of stream data starting from the start address AH 72*h* (time t30–).

After the completion of DMA transfer A 95*h*, bus controller 21 starts DMA transfer B 96*g* with an operation similar to the one in "time t13–" (time t31–).

After the completion of DMA transfer B 96*g*, bus controller 21 starts DMA transfer C 97*f*, based on command list CF 81*f* for the next port 44*c*, for transferring 1,808 bytes of stream data starting from the start address CF 82*f* because DMA command bit BG 78*g* for port 44*b* is "01" (time t32–).

After the completion of DMA transfer C 97*f*, bus controller 21 attempts to start a DMA transfer for the next port because DMA command bit CF 83*f* for port 44*c* is "11" indicating "wait for frame pulse C." However, bus controller 21 skips port 44*d* since it is waiting for frame pulse D. Accordingly, bus controller 21 starts DMA transfer A 95*i*, based on command list AI 71*i* for the next port 44*a*, for transferring 1,808 bytes of stream data starting from the start address AI 72*i* (time t33–).

After the completion of DMA transfer A 95*i*, DMA command bit AI 73*i* for port 44*a* is "10" indicating "end of chain" of port 44*a*. Accordingly, bus controller 21 starts DMA transfer B 96*h*, based on command list BH 76*h* for the next port 44*b*, for transferring 4,096 bytes of stream data starting from the start address BH 77*h* (time t34–).

After the completion of DMA transfer B 96*h*, bus controller 21 attempts to start a DMA transfer for the next port because DMA command bit BH 78*h* for port 44*b* is "01." However, bus controller 21 skips ports 44*c* and 44*d* since they are respectively waiting for frame pulses C and D. Bus controller 21 also skips port 44*a* since its chain list has ended. Accordingly, bus controller 21 starts DMA transfer B 96*i*, based on command list BI 76*i* for the next port 44*b* for transferring 1,808 bytes of stream data starting from the start address BI 77*i* (time t35–).

After the completion of DMA transfer B 96*i*, bus controller 21 attempts to start a DMA transfer for the next port since DMA command bit BI 78*i* for port 44*b* is "10" indicating "end of chain" of port 44*b*. However, bus controller 21 skips ports 44*c* and 44*d* since they are respectively waiting for frame pulses C and D. Bus controller 21 also skips port 44*a* since its chain list has ended (time t36–).

Bus controller 21 starts DMA transfers D 98*d* to D 98*f* with operations similar to those in "time t21–t24" (time t37–40).

Bus controller 21 starts DMA transfers D 97*g* to C 97*i* with operations similar to those in "time t21–t24" (time t41–44).

Bus controller 21 starts DMA transfers D 98*g* to D 98*i* with operations similar to those in "time t21–t24" (time t45–48).

As described above, the present invention enables arbitrary setting of the size of the stream data for one DMA transfer for each port and enables arbitrary setting of the number of successive DMA transfers per port by generating the chain list, which indicates information required by CPU for DMA transfers, for each port.

The chain list for each port is stored in a memory. The address of the chain list is transferred to the chain address counter for each port.

In the present invention, stream data is DMA-transferred by obtaining chain lists related to the control registers which have received both the data transfer request command from CPU and the frame request signal from a corresponding port, where the chain lists are obtained in the order, and the chain lists are specified by the addresses included in the corresponding chain address counters for the corresponding ports. This excludes the necessity of synchronizing the ports and stream data is transferred almost as specified in the chain lists.

It is needless to say that various modifications to the above embodiment of the present invention are possible. For example, the DMA controller and the buffer controller of BFIFO 23 do not necessarily have the same bit width. Also, BFIFO 23 and buffer 33 may have the same bus width. Buffer 33 may use a two-way FIFO or DRAM, instead of the field memory.

Furthermore, a total of the base address and the value in DMA data counter 22*b* may be stored in DMA address counter 22*a*. In the present embodiment, DMA data counter 22*b* is incremented by the amount of transferred data. However, the amount of transferred data may be added to the base address to indicate an address.

In case of high-resolution, high-bit-rate stream data such as stream data having 125,000 bytes per frame, 31 command lists are generated for one frame. The 31 command lists are transferred by switching ports. Here, for an arbitrary port, the DMA transfer is performed with almost the same performance regardless of other ports executing any part of the command list.

The direction of the DMA transfer is stored in a control register corresponding to a port and is changed for each DMA command. Therefore, BFIFO 23 does not store mixed-up data of a plurality of ports.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data transfer apparatus for DMA-transferring stream data between a memory and each of n ports, the memory including a plurality of memory areas and prestoring at least one command list each of which includes a start address of one of the plurality of memory areas in which the piece of stream data is stored and includes a size of the piece of stream data, wherein n is an integer either of equal to and greater than "2," the data transfer apparatus comprising:

an address counter for storing a start address of one of the plurality of memory areas between which and one of the n ports a piece of stream data next in order is DMA-transferred, and the address counter is used for each of n ports;

a data counter for storing a size of the piece of stream data next in order, wherein the data counter is used for each of n ports;

n chain address counters each for storing an address of a memory area, wherein a certain chain address counter includes an address of a memory area in which a certain command list is stored and the certain command list includes an address corresponding to the start address included in the address counter and includes a size corresponding to the size included in the data counter, wherein the n chain address counters respectively correspond to the n ports; and stream data transferring means for DMA-transferring a piece of stream data of the size included in the data counter between the one of the n ports corresponding to the certain chain address counter and the memory area specified by the start address included in the address counter.

2. The data transfer apparatus of claim 1 further comprising:

command list generating means for generating a command list, storing the command list into the memory, and transferring an address of the command list to a chain address counter corresponding to one of the n ports used for transferring a piece of stream data.

3. The data transfer apparatus of claim 1 further comprising:

port selecting means for selecting one out of the n ports; and command list transferring means for, each time the port selecting means selects a port, obtaining a command list stored in a memory area specified by an address stored in a chain address counter which corresponds to the port selected by the port selecting means, transferring a start address included in the command list to the address counter, transferring a size included in the command list to the data counter, and updates the address stored in the chain address counter, wherein each time the command list transferring means transfers the size to the data counter, the stream data transferring means DMA-transfers a piece of stream data between the port selected by the port selecting means and the memory area specified by the start address stored in the address counter, wherein the piece of stream data is of the size stored in the data counter.

4. The data transfer apparatus of claim 3 further comprising:

command list generating means for generating a command list, storing the command list into the memory, and transferring an address of the command list to a chain address counter corresponding to one of the n ports used for transferring a piece of stream data.

5. The data transfer apparatus of claim 3, wherein each command list includes a command indicating either of selecting a current port and selecting a new port, wherein each time the port selecting means selects a port, the command list transferring means obtains a command list stored in a memory area specified by an address stored in a chain address counter which corresponds to the port selected by the port selecting means and transfers the command included in the command list to the port selecting means, wherein after the stream data transferring means completes a DMA transfer, the port selecting means, based on a predetermined order and the command obtained by the command list transferring means, selects either of a new port and a current port.

6. The data transfer apparatus of claim 5 further comprising:

command list generating means for generating a command list, storing the command list into the memory, and transferring an address of the command list to a chain address counter corresponding to one of the n ports used for transferring a piece of stream data.

7. The data transfer apparatus of claim 5, wherein at least one of the n ports outputs a transfer request signal which requests a certain amount of stream data to be transferred, wherein the data transfer apparatus further comprises:

receiving means for receiving the transfer request signal from the n ports, wherein the port selecting means selects one port out of ports from which the receiving means receives the transfer request signal.

8. The data transfer apparatus of claim 7 further comprising:

command list generating means for generating a command list, storing the command list into the memory, and transferring an address of the command list to a chain address counter corresponding to one of the n ports used for transferring a piece of stream data.

9. The data transfer apparatus of claim 7, wherein at least one of the n ports outputs the transfer request signal at intervals of a certain time period, wherein the receiving means includes:

n request bit storing means, wherein when the receiving means receives a transfer request signal from a port, a request bit storing means corresponding to the port which has sent the transfer request signal sets a request bit, the n request bit storing means respectively corresponding to the n ports, wherein when the command indicates selecting a new port, the command further indicates whether to clear the request bit set by the request bit storing means, wherein the port selecting means, based on the command transferred from the command list transferring means, clears the request bit set by the request bit storing means and alternatively does not perform any certain process, wherein the port selecting means selects one port out of ports which correspond to request bit storing means which have set request bits.

10. The data transfer apparatus of claim 9 further comprising:

command list generating means for generating a command list, storing the command list into the memory, and transferring an address of the command list to a chain address counter corresponding to one of the n ports used for transferring a piece of stream data.

11. The data transfer apparatus of claim 9 further comprising:

bus width conversion command generating means for, each time the port selecting means selects a port, generating a bus width conversion command based on the port selected by the port selecting means and the size stored in the data counter and sending the generated bus width conversion command to a bus width converting means, wherein the bus width conversion command includes a piece of information specifying a port and a piece of information specifying a data length of stream data; and the bus width converting means for, based on the bus width conversion command, transferring stream data between the port specified by the piece of information and the memory by performing either of a first conversion and a second conversion, wherein in the first conversion a bus width for the port specified by the piece of information included in the bus width conversion command is converted to a bus width for the memory, and in the second conversion the bus width for the memory is converted to the bus width for the port specified by the piece of information included in the bus width conversion command, the stream data being of the data length specified by the piece of information included in the bus width conversion command, wherein the bus width converting means is used for each of n ports, wherein the stream data transferring means DMA-transfers a piece of stream data between the memory and the bus width converting means instead of the port selected by the port selecting means.

12. The data transfer apparatus of claim 11 further comprising:

command list generating means for generating a command list, storing the command list into the memory, and transferring an address of the command list to a chain address counter corresponding to one of the n ports used for transferring a piece of stream data.

13. The data transfer apparatus of claim 11 further comprising:

first buffer means for storing stream data between the memory and the bus width converting means, wherein the first buffer means is used for each of n ports, wherein the stream data transferring means DMA-transfers a piece of stream data between the memory and the first buffer means instead of the bus width converting means.

14. The data transfer apparatus of claim 13 further comprising:

command list generating means for generating a command list, storing the command list into the memory, and transferring an address of the command list to a chain address counter corresponding to one of the n ports used for transferring a piece of stream data.

15. The data transfer apparatus of claim 13 further comprising:

n second buffer means, which respectively correspond to the n ports, each for storing stream data between a corresponding port and the bus width converting means, wherein the bus width converting means transfers stream data between the memory and the n second buffer means instead of the port.

16. The data transfer apparatus of claim 15 further comprising:

command list generating means for generating a command list, storing the command list into the memory, and transferring an address of the command list to a chain address counter corresponding to one of the n ports used for transferring a piece of stream data.

17. The data transfer apparatus of claim 15, wherein the data transfer apparatus further DMA-transfers stream data between an m-times-speed port and the memory, wherein m is an integer either of equal to and smaller than n, and the data transfer apparatus further comprises:

m first I/O controllers, which respectively correspond to m second buffer means out of the n second buffer means, each for selecting either of a port and the m-times-speed port and controlling input/output of stream data between either of the port and the m-times-speed port selected and a corresponding second buffer means; and (n-m) second I/O controllers, which respectively correspond to (n-m) second buffer means other than the m second buffer means, each for controlling input/output of stream data between a corresponding second buffer means and a corresponding port, wherein each of the n second buffer means stores stream data between the bus width converting means and a corresponding I/O controller, which is either of a first I/O controller and a second I/O controller, instead of the corresponding port, wherein the m-times-speed port is connected to each of the m first I/O controllers, the n ports are respectively connected to the m first I/O controllers and the (n-m) second I/O controllers.

18. The data transfer apparatus of claim 17 further comprising:

command list generating means for generating a command list, storing the command list into the memory, and transferring an address of the command list to a chain address counter corresponding to one of the n ports used for transferring a piece of stream data.

19. A data transfer apparatus for DMA-transferring stream data from a mass storage to each of n ports, wherein n is an integer either of equal to and greater than "2," the data transfer apparatus comprising:

the mass storage for prestoring the stream data;

a memory which includes a plurality of memory areas for storing the stream data;

command list generating means for generating at least one first command list, wherein each first command list includes an identifier identifying a piece of stream data stored in the mass storage, an address of one of the plurality of memory areas in which the piece of stream data is stored, and a size of the piece of stream data;

first data transferring means for DMA-transferring the piece of stream data from the mass storage to the memory based on the first command, wherein the command list generating means transfers the first command list to the first data transferring means, generates a second command list, and stores the second command list into the memory, the second command list including: a start address of a memory area in which a piece of stream data is stored; a size of the piece of stream data; and a command indicating either of selecting a current port and selecting a new port; and second data transferring means which includes:

an address counter for storing a start address of one of the plurality of memory areas, wherein a piece of stream data next in order is DMA-transferred from the one of the plurality of memory areas to one of the n ports, and the address counter is used for each of n ports;

a data counter for storing a size of the piece of stream data next in order, wherein the data counter is used for each of n ports;

n chain address counters each for storing an address of a memory area, wherein a certain chain address counter includes an address of a memory area in which a certain second command list is stored and the certain command list includes an address corresponding to the start address included in the address counter and includes a size corresponding to the size included in the data counter, wherein the n chain address counters respectively correspond to the n ports;

port selecting means for selecting one out of the n ports;

command list transferring means for, each time the port selecting means selects a port, obtaining a second command list stored in a memory area specified by an address stored in a chain address counter which corresponds to the port selected by the port selecting means, transferring a start address included in the second command list to the address counter, transferring a size included in the second command list to the data counter, transferring the command included in the second command list to the port selecting means, and updates the address stored in the chain address counter; and stream data transferring means for DMA-transferring a piece of stream data being of the size stored in the data counter from a memory area specified by the start address stored in the address counter to the port selected by the port selecting means, wherein each time the port selecting means selects a port, the command list transferring means obtains a command list stored in a memory area specified by an address stored in a chain address counter which corresponds to the port selected by the port selecting means and transfers the command included in the command list to the port selecting means, wherein after the stream data transferring means completes a DMA transfer, the port selecting means, based on a predetermined order and the command obtained by the command list transferring means, selects either of a new port and a current port, wherein each time the command list transferring means transfers the size to the data counter, the stream data transferring means DMA-transfers a piece of stream data being of the size stored in the data counter from a memory area specified by the start address stored in the address counter to the port selected by the port selecting means, wherein after the first data transferring means DMA-transfers a piece of stream data from the mass storage to the memory, the command list generating means transfers an address of the second command list to a chain address counter which corresponds to a port to which a piece of stream data is DMA-transferred.

20. A data transfer apparatus for DMA-transferring stream data from each of n ports to a mass storage, wherein n is an integer either of equal to and greater than "2," the data transfer apparatus comprising:

the mass storage for prestoring the stream data;

a memory which includes a plurality of memory areas for storing the stream data;

a command list generating means for generating a second command list and storing the second command list into the memory, the second command list including: a start address of a memory area in which a piece of stream data is stored; a size of the piece of stream data; and a command indicating either of selecting a current port and selecting a new port; and second data transferring means which includes:

an address counter for storing a start address of one of the plurality of memory areas, wherein a piece of stream data next in order is DMA-transferred from one of the n ports to the one of the plurality of memory areas, and the address counter is used for each of n ports;

a data counter for storing a size of the piece of stream data next in order, wherein the data counter is used for each of n ports;

n chain address counters each for storing an address of a memory area, wherein a certain chain address counter includes an address of a memory area in which a certain second command list is stored and the certain command list includes an address corresponding to the start address included in the address counter and includes a size corresponding to the size included in the data counter, wherein the n chain address counters respectively correspond to the n ports;

port selecting means for selecting one out of the n ports;

command list transferring means for, each time the port selecting means selects a port, obtaining a second command list stored in a memory area specified by an address stored in a chain address counter which corresponds to the port selected by the port selecting means, transferring a start address included in the second command list to the address counter, transferring a size included in the second command list to the data counter, transferring the command included in the second command list to the port selecting means, and updates the address stored in the chain address counter; and stream data transferring means for DMA-transferring a piece of stream data being of the size stored in the data counter from a memory area specified by the start address stored in the address counter to the port selected by the port selecting means, wherein each time the port selecting means selects a port, the command list transferring means obtains a command list stored in a memory area specified by an address stored in a chain address counter which corresponds to the port selected by the port selecting means and transfers the command included in the command list to the port selecting means, wherein after the stream data transferring means completes a DMA transfer, the port selecting means, based on a predetermined order and the command obtained by the command list transferring means, selects either of a new port and a current port, wherein each time the command list transferring means transfers the size to the data counter, the stream data transferring means DMA-transfers a piece of stream data being of the size stored in the data counter from the port selected by the port selecting means to a memory area specified by the start address stored in the address counter to, wherein the command list generating means transfers an address of the second command list to the second data transferring means, generates a first command list, and stores the first command list in the memory, wherein the first command list includes an identifier identifying a piece of stream data stored in the mass storage, an address of one of the plurality of memory areas in which the piece of stream data is stored, and a size of the piece of stream data, wherein the data transfer apparatus further comprises:

first data transferring means for DMA-transferring the piece of stream data from the memory to the mass storage based on the first command list generated by the command list generating means, wherein after the second data transferring means DMA-transfers a piece of stream data to the memory, the command list generating means transfers an address of the first command list to the first data transferring means.

* * * * *